(12) United States Patent
Nakayama et al.

(10) Patent No.: US 10,243,383 B2
(45) Date of Patent: Mar. 26, 2019

(54) POWER SOURCE AND ELECTRONIC DEVICE

(71) Applicant: SEIKO EPSON CORPORATION, Tokyo (JP)

(72) Inventors: Junpei Nakayama, Matsumoto (JP); Ryohei Horita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 114 days.

(21) Appl. No.: 15/386,093

(22) Filed: Dec. 21, 2016

(65) Prior Publication Data

US 2017/0187184 A1    Jun. 29, 2017

(30) Foreign Application Priority Data

Dec. 25, 2015  (JP) ................................. 2015-253161
Dec. 25, 2015  (JP) ................................. 2015-253162

(51) Int. Cl.
*H02J 7/00*  (2006.01)

(52) U.S. Cl.
CPC .......... *H02J 7/0065* (2013.01); *H02J 7/0024* (2013.01)

(58) Field of Classification Search
CPC ............................ H02J 7/0024; H02J 7/0065
USPC ..................................... 307/77; 320/120–122
See application file for complete search history.

(56) References Cited

U.S. PATENT DOCUMENTS

2012/0293003 A1* 11/2012 Shimamura ......... H01M 10/052
                                                             307/77

FOREIGN PATENT DOCUMENTS

JP         04-332015         11/1992
JP         06-237542         8/1994

* cited by examiner

*Primary Examiner* — Hal Kaplan
(74) *Attorney, Agent, or Firm* — Workman Nydegger

(57) ABSTRACT

A power source is configured to include a plurality of batteries and a switching circuit that switches a state to and from a first state in which the electric power is supplied to the outside by the plurality of batteries being connected in series and a second state in which the electric power is supplied to the outside using remaining batteries without using a part of the plurality of batteries.

10 Claims, 14 Drawing Sheets

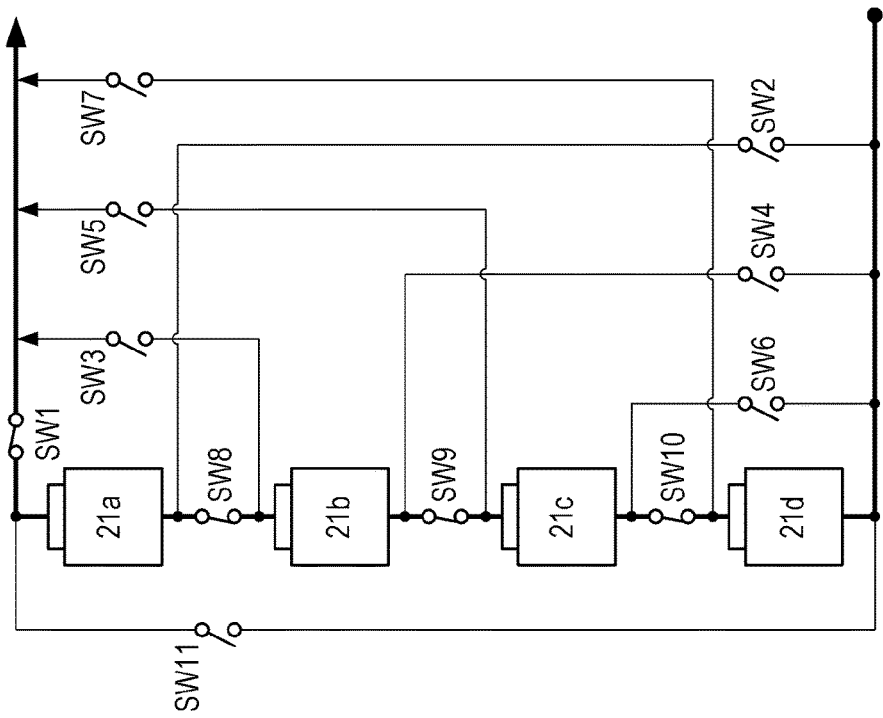
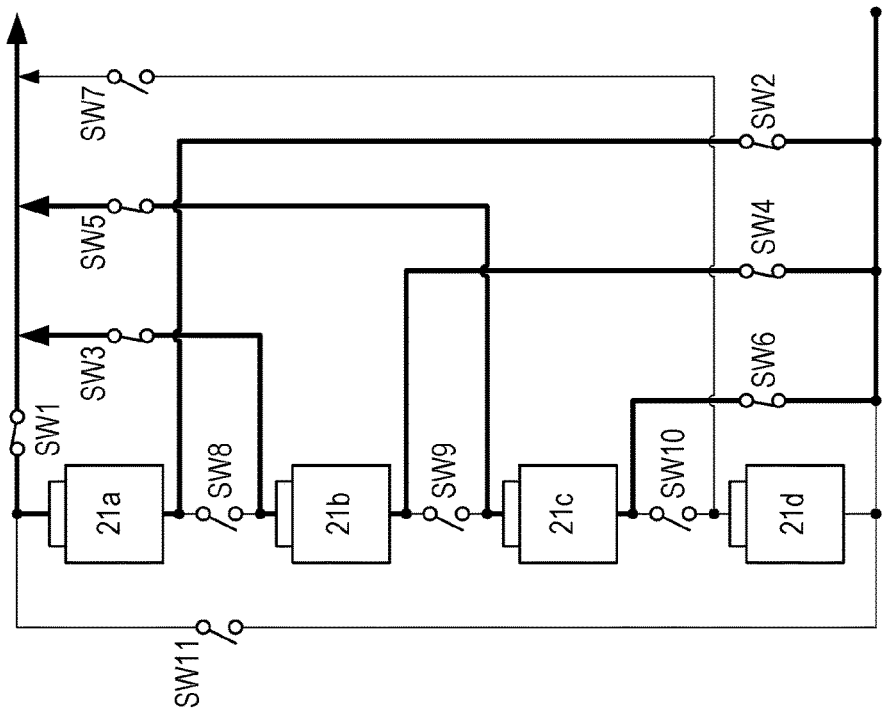

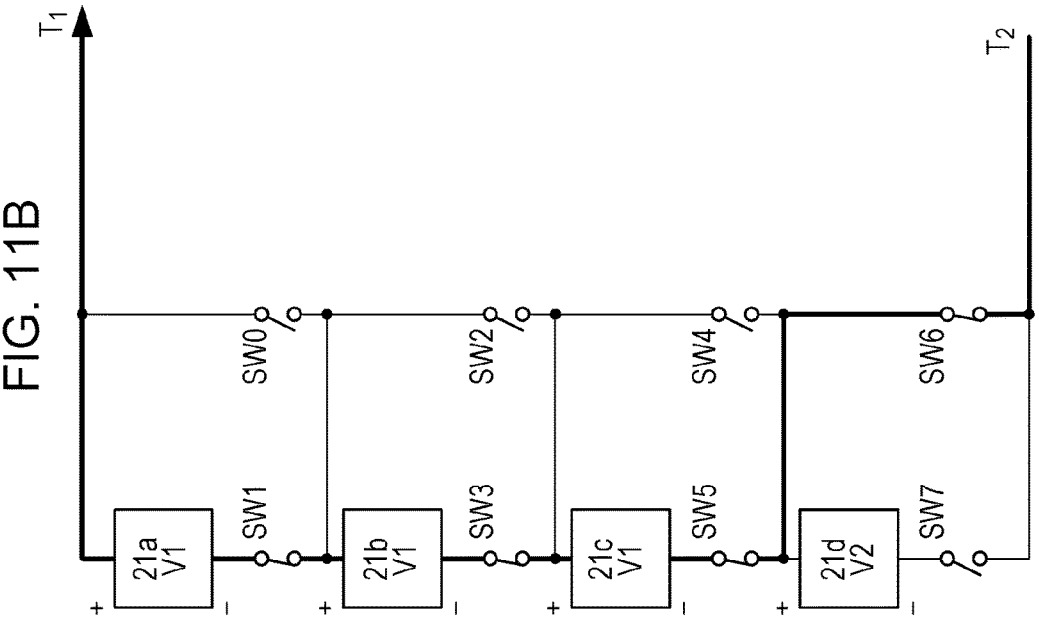
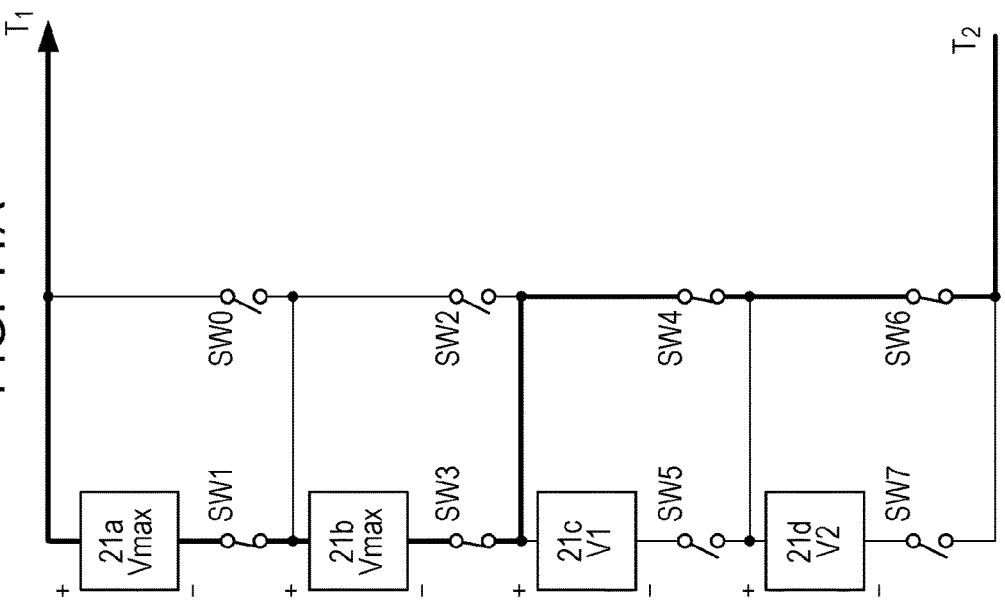

POWER SOURCE AND ELECTRONIC DEVICE

CROSS-REFERENCE TO RELATED APPLICATIONS

The present application claims priority to Japanese Patent Application No. 2015-253161, filed Dec. 25, 2015, and Japanese Patent Application No. 2015-253162, filed Dec. 25, 2015, which applications are expressly incorporated by reference herein.

BACKGROUND

1. Technical Field

The present invention relates to a power source and an electronic device.

2. Related Art

In the related art, a technology is known, in which electric power is supplied to an electronic device from a power source including a plurality of batteries. For example, in JP-A-4-332015, a power source circuit is disclosed, in which two batteries are connected in series in a use state and are connected in parallel in a non-use state.

In an electronic device in recent years, an electric power load in many devices is changed in the process of using. For example, in many devices, the state is changed to and from a high load state in which a drive unit is driven by a motor and a low load state in which a user's input is waited. In the technology in the related art described above, the connection is changed to and from the connection in series and connection in parallel according to a use or a non-use. However, in any cases, entire of the batteries are connected to the circuit to be used. Therefore, entire of the batteries gradually deteriorate in all the state.

SUMMARY

An advantage of some aspects of the invention is to provide a technology for efficiently using the batteries.

According to an aspect of the invention, a power source includes a plurality of batteries and a switching circuit that switches a state to and from a first state in which the electric power is supplied to the outside by the plurality of batteries being connected in series and a second state in which the electric power is supplied to the outside using remaining batteries without using a part of the plurality of batteries.

That is, the power source switches the state to and from the first state in which the plurality of batteries are connected in series and the second state in which the remaining batteries are used without a part of the plurality of batteries being used according to the external load. Here, in the first state, since a plurality of batteries are connected in series, the maximum value can be obtained as an output among the voltages which can be output from the plurality of batteries connected in series. In addition, in the second state, since a part of the batteries are not connected and the remaining batteries are used, the batteries not in use are hard to deteriorate, and thus, it is possible to use the batteries efficiently.

BRIEF DESCRIPTION OF THE DRAWINGS

The invention will be described with reference to the accompanying drawings, wherein like numbers reference like elements.

FIG. 5A is a diagram illustrating an example of a first state, and FIG. 5B is a diagram illustrating a state in which cells are connected in parallel.

FIG. 11A to FIG. 11B are diagrams illustrating examples of selecting battery packs.

DESCRIPTION OF EXEMPLARY EMBODIMENTS

Figure 1A:
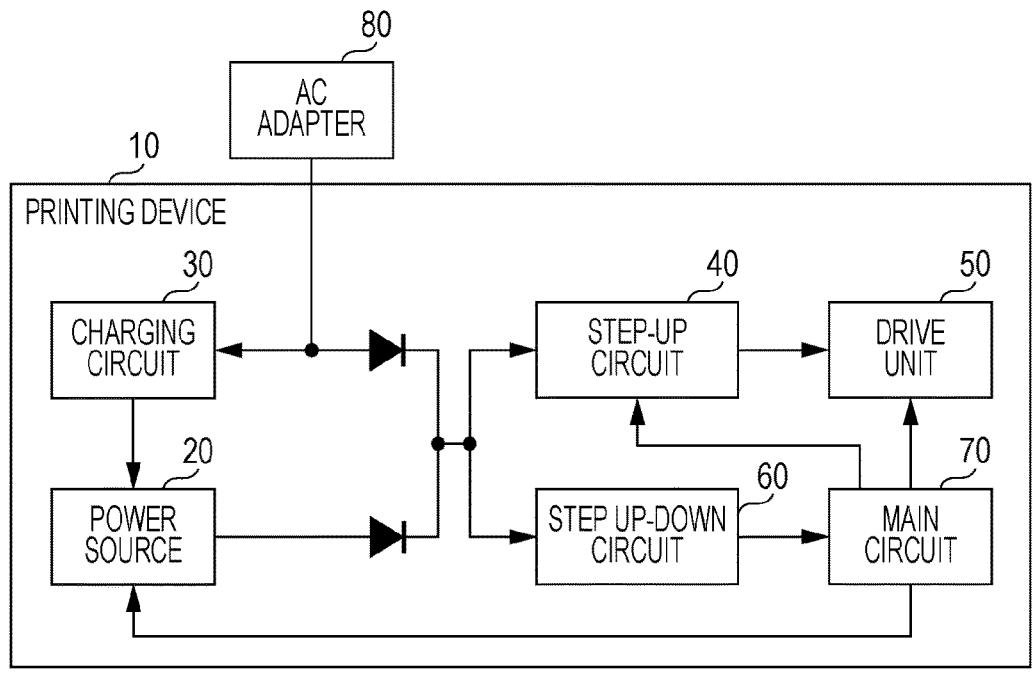
FIG. 1A is a block diagram illustrating a printing device that includes a power source in the first embodiment.

Here, embodiments of the present invention will be described in following order.
First Embodiment
1. Configuration of a Printing Device
2. Configuration of a Power Source
2-1. Processing in a Main Circuit
2-2. Processing in a Control IC
Second Embodiment
3. Configuration of a Printing Device
4. Configuration of a Power Source
4-1. Processing in a Main Circuit
4-2. Processing in a Control IC
5. Example of Selecting Battery Packs
6. Other Embodiments
First Embodiment
1. Configuration of a Printing Device FIG. 1A is a block diagram illustrating a printing device 10 driven by a power source 20 (battery packs) in an embodiment of the present invention. The printing device 10 includes a mounting portion (not illustrated) that can mount the power source 20 and a connection terminal to an AC adapter 80, and is driven by receiving the electric power from the power source 20 connected to the mounting portion or the AC adapter 80 connected to the terminal.

The printing device 10 illustrated in FIG. 1A includes a power source 20, a charging circuit 30, a step-up circuit 40, a drive unit 50, a step up-down circuit 60, and a main circuit 70. The AC adapter 80 includes a circuit that receives an AC power from a commercial power source and converts the AC power to a DC power having a predetermined voltage. In the present embodiment, the voltage of the DC power output from the AC adapter 80 is 24 V.

The power source 20 includes a plurality of batteries (in the present embodiment, lithium ion batteries as four secondary batteries (referred to as cells) described below, but not limited thereto), and the power source 20 can output the electric power to the outside in two types of voltages by switching using a switching circuit described below. In the present embodiment, the two types of voltages are a voltage in a case where four cells are connected in series and a voltage of one cell (details are described below). In addition, in the present embodiment, the specification of each cell is the same and the voltage of one cell is 3 to 4 V. Therefore, the voltage in a case where four cells are connected in series is 12 to 16 V. The power source 20 is connected to the step-up circuit 40 and the step up-down circuit 60 via a diode.

The charging circuit 30 is connected to the AC adapter 80 and the power source 20, and includes a circuit for charging the batteries using the electric power supplied from the AC adapter 80. The plurality of cells included in the power source 20 is charged based on the output from the charging circuit 30, and various types triggering for starting the charging can be assumed. For example, the triggering can be made when the user operates the operation unit (not illustrated), when the AC adapter 80 is connected to the printing device 10, and when a predetermined time has elapsed without performing the printing in a state in which the AC adapter 80 is connected to the printing device 10.

The step-up circuit 40 is a circuit that steps the voltage of the input electric power up to a predetermined voltage and outputs the result, and output wirings of the AC adapter 80 and the power source 20 are connected to the step-up circuit 40 via diodes. In addition, the output wiring of the step-up circuit 40 is connected to the drive unit 50, and thus, the output electric power from the step-up circuit 40 is supplied to the drive unit 50. The predetermined voltage in the present embodiment is 42 V. Therefore, the step-up circuit 40 steps the output voltage (24V) from the AC adapter 80 or the output voltage (12~16V) up to 42 V from the power source 20, and supplies 42 V of electric power to the drive unit 50. The step-up circuit 40 is configured to receive a control signal from the main circuit 70, and the main circuit 70 can stop the operation of the step-up circuit 40 using the control signal.

The drive unit 50 is a part driven for realizing the printing in the printing device 10 and includes a printing head, a carriage, a printing medium transport device, and the like (not illustrated). In the present embodiment, the drive unit 50 is driven by configuration elements such as a piezo-element and a motor. That is, each configuration element is driven by the electric power output from the step-up circuit 40 being supplied to each configuration element. The control signal is input to the drive unit 50 from the main circuit 70 and the drive timing or the like is controlled by the control signal.

The step up-down circuit 60 is a circuit that converts (step-up or step-down the voltage of the input electric power) to the predetermined voltage and outputs the result, and the output wirings of the AC adapter 80 and the power source 20 are connected step up-down circuit 60 via the diodes. In addition, the output wiring of the step up-down circuit 60 is connected to the main circuit 70, and thus, the output electric power of the step up-down circuit 60 is supplied to the main circuit 70. The predetermined voltage in the present embodiment is 3.3 V. Therefore, the step up-down circuit 60 steps the output voltage (24V) of the AC adapter 80 or the output voltage (12 to 16V) of the power source 20 down to 3.3 V, and supplies the 3.3 V of electric power to the main circuit 70.

The main circuit 70 includes a control unit having a CPU (not illustrated), a memory, and the like, and can executes a predetermined program for performing the printing. In the present embodiment, the main circuit 70 includes an interface to a (not illustrated) operation unit or an external device, acquires information indicating the print target from the external device (a memory, a computer, or the like) according to the user's operation of the operation unit, performs predetermined processing to generate a print image, and appropriately controls the drive unit 50 to print the print image on a print medium.

When performing the printing by driving the drive unit 50, the main circuit 70 supplies the electric power having a voltage 42 V to the drive unit 50 without stopping the step-up circuit 40, and this state will be referred to as a print mode in this specification. In a case where a predetermined time set in advance elapses without the drive unit 50 being driven, the main circuit 70 outputs the control signal to the step-up circuit 40 to stop the step-up circuit 40. In this case, the electric power for generating the voltage 42 V that is a relatively high voltage compared to the voltage 3.3 V supplied to the main circuit 70 is not supplied to the step-up circuit 40 from the power source 20 or the AC adapter 80. Therefore, this state is a state in which the consumption of electric power is less than that in the print mode, and this state is referred to as an electric power saving mode.

The main circuit 70 can control the stop or non-stop of the step-up circuit 40 and the drive timing of the drive unit 50, and additionally, can control the power source 20. That is, the main circuit 70 and the power source 20 are connected to each other through a signal line, and thus, the main circuit 70 can output a signal (a print mode signal) indicating that the current time is in the print mode and a signal (an electric power saving mode signal) indicating that the current time is in the electric power saving mode to the power source 20 via the signal line.

2. Configuration of the Power Source

Figure 2:
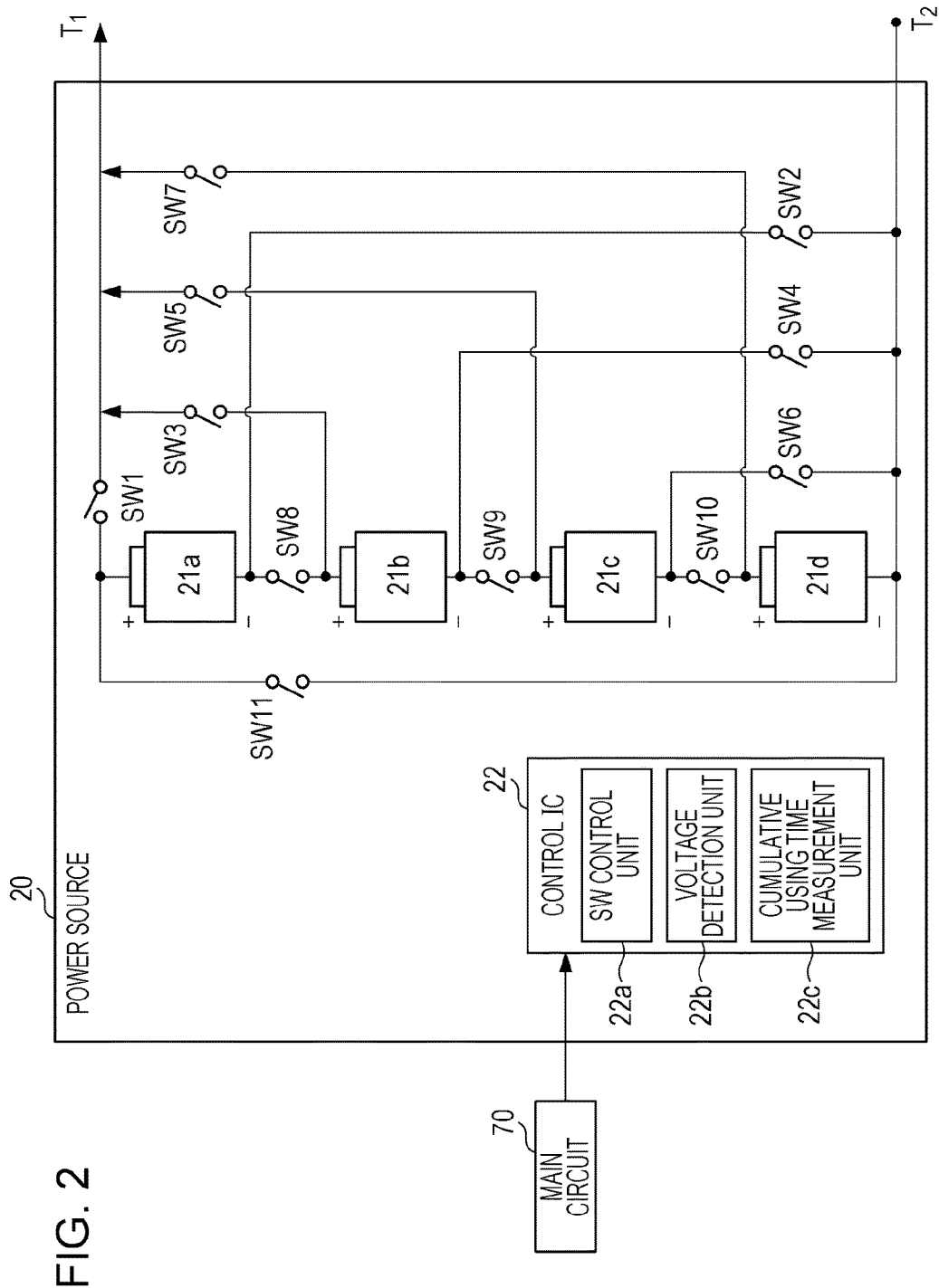
FIG. 2 is a diagram illustrating a configuration of the power source.

The power source 20 is configured to output the electric powers having different voltages depending on the above-described modes (the print mode and the electric power saving mode). FIG. 2 is a block diagram illustrating the internal configuration of the power source 20. The power source 20 includes cells 21a to 21d, a control IC 22, and switches SW1 to SW11. The cells 21a to 21d are the batteries that output DC power having the voltages of 3 to 4 V depending on the amount of charging as described above.

The control IC 22 includes the control unit having a (not illustrated) CPU, a memory, and the like), and can perform a predetermined function by executing a program recorded in advance in a ROM. In the present embodiment, the program includes a program module such as a SW control unit 22a, a voltage detection unit 22b, and a cumulative using time measurement unit 22c, and the SW control unit 22a causes the control IC 22 to realize a function of controlling the switches SW1 to SW11. That is, the switches SW1 to SW11 are the switches that can electrically switch the ON and OFF state (for example, a MOS-FET or the like), and the control IC 22 can set the ON or OFF state of the switches SW1 to SW11 according to the processing in the SW control unit 22a via the signal line (not illustrated).

The voltage detection unit 22b causes the control IC 22 to realize the function of detecting the voltage of the cells 21a to 21*d*. That is, the control IC 22 includes a (not illustrated) A/D converter and wirings, and the control IC 22 can acquire the voltages of the cells 21*a* to 21*d* which are converted by the A/D converter from analog values to digital values according to the processing in the voltage detection unit 22*b*.

The cumulative using time measurement unit 22*c* causes the control IC 22 to realize the function of detecting the cumulative using time with regard to each of the cells 21*a* to 21*d*. That is, the control IC 22 secures a storage area in the memory (not illustrated) for storing the cumulative using time of each of the cells 21*a* to 21*d*. In the present embodiment, since the cells to be used are determined by the combination of the switches SW1 to SW11, the control IC 22 specifies the cells in use based on the states of the switches SW1 to SW11 according to the processing in the cumulative using time measurement unit 22*c*, and measures a using time using a clock circuit (not illustrated). Furthermore, the control IC 22 adds the newly measured using time to the cumulative using time stored in the storage area with regard to the cells in use.

The switches SW1 to SW11 are wired in such a manner that a connection state (a first state) in which all the cells 21*a* to 21*d* are connected in series for supplying the electric power to the outside or a connection state (a second state) in which any one cell among the cells 21*a* to 21*d* supplies the electric power to the outside, can be realized. That is, the switch SW1 interposes between a positive electrode of the cell 21*a* and an external terminal T1, and the switch SW2 interposes between a negative electrode of the cell 21*a* and an external terminal T2. In addition, the switch SW3 interposes between the positive electrode of the cell 21*b* and the external terminal T1, the switch SW4 interposes between the negative electrode of the cell 21*b* and the external terminal T2, the switch SW5 interposes between the positive electrode of the cell 21*c* and the external terminal T1, the switch SW6 interposes between the negative electrode of the cell 21*c* and the external terminal T2, the switch SW7 interposes between the positive electrode of the cell 21*d* and the external terminal T1, the switch SW8 interposes between the negative electrode of the cell 21*a* and the positive electrode of the cell 21*b*, the switch SW9 interposes between the negative electrode of the cell 21*b* and the positive electrode of the cell 21*c*, the switch SW10 interposes between the negative electrode of the cell 21*c* and the positive electrode of the cell 21*d*, and the switch SW11 interposes between the positive electrode of the cell 21*a* and the negative electrode of the cell 21*d*.

In the present embodiment, the power source 20 switches the cells to be used using the control IC 22 and the switches SW1 to SW11 according to the external load (any of the print mode or the electric power saving mode). Therefore, the control IC 22 and the switches SW1 to SW11 function as the switching circuit. In addition, in the present embodiment, the power source 20 switches the cells such that electric power conversion efficiency does not deteriorate due to the voltage conversion. Here, the switching of the cells according to the processing in the main circuit 70 and the processing in the control IC 22 will be described in detail.

2-1. Processing in the Main Circuit

Figure 1B:
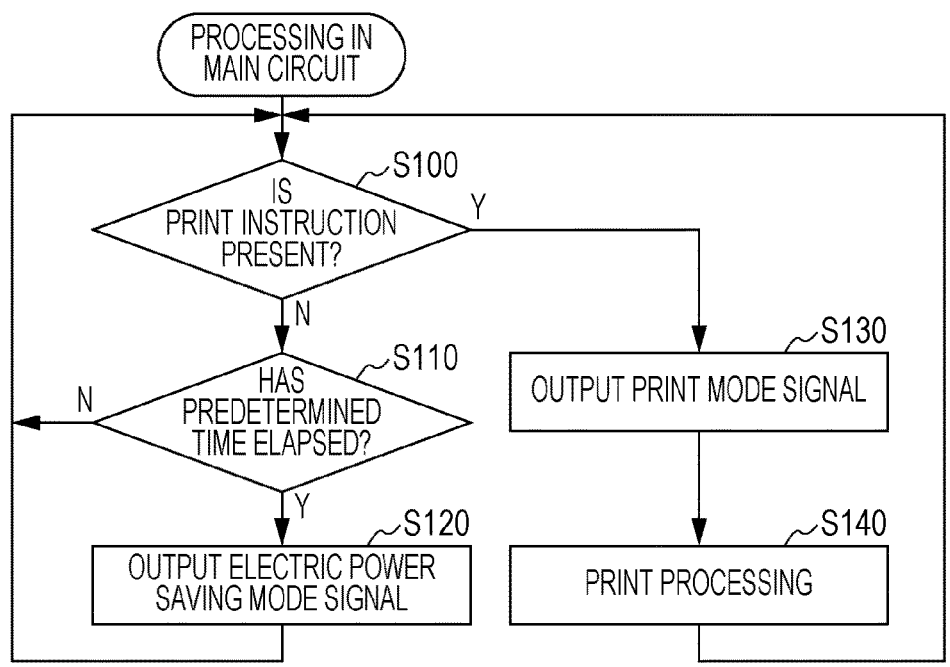
FIG. 1B is a flowchart illustrating processing in a main circuit.

FIG. 1B is a flowchart illustrating processing in the main circuit 70. When the printing device 10 is started to operate, even in a state in which the electric power is supplied from any one of the power source 20 and the AC adapter 80, the electric power having the voltage 3.3 V which is to be supplied to the main circuit 70 is generated by the step up-down circuit 60. When the electric power having the voltage 3.3 V is output from the step up-down circuit 60, the main circuit 70 performs the processing in the main circuit illustrated in FIG. 1B.

In the processing, the main circuit 70 determines whether or not the print instruction is present (STEP S100). That is, in a case where there is a user's instruction to start the printing through the operation unit (not illustrated), the main circuit 70 determines that the print instruction is present. In a case where it is not determined that the print instruction is present in STEP S100, the main circuit 70 determines whether or not a predetermined time elapses without the determination that the instruction is present (STEP S110). That is, in a case where it is not determined that the print instruction is present in STEP S100, the main circuit 70 starts to measure the elapsed time using a clock circuit (not illustrated). In a case where the result of measurement is equal to or greater than the predetermined time (a time regulated in advance as a waiting time for being shifted to the electric power saving mode), the main circuit 70 determines that the predetermined time elapsed.

In a case where it is not determined that the predetermined time elapsed in STEP S110, the main circuit 70 repeats the processing items subsequent to STEP S100. On the other hand, in a case where it is determined that the predetermined time elapsed in STEP S110, the main circuit 70 outputs the electric power saving mode signal (STEP S120). That is, the main circuit 70 outputs a signal indicating that the current time are in the electric power saving mode to the power source 20. In addition, the main circuit 70 outputs the control signal to the step-up circuit 40 to stop the step-up circuit 40. Then, the main circuit 70 repeats the processing items subsequent to STEP S100.

On the other hand, in a case where it is determined that the print instruction is present in STEP S100, the main circuit 70 outputs the print mode signal (STEP S130). That is, the main circuit 70 outputs the signal indicating that the current time is in the print mode to the power source 20. Next, the main circuit 70 performs the print processing (STEP S140). That is, the main circuit 70 outputs the control signal to the step-up circuit 40 to cause the step-up circuit 40 to be in a non-stop state. As a result, the electric power having the voltage 42V is output from the step-up circuit 40. In addition, the main circuit 70 specifies a print target according to the operation of the operation unit by the user, and performs predetermined processing to generate a print image. Furthermore, the main circuit 70 outputs the control signal to the drive unit 50 and drives the print head, the carriage, the printing medium transport device, or the like to print the print image. When the print processing ends, the main circuit 70 repeats the processing items subsequent to STEP S100.

2-2. Processing in the Control IC

Figure 3:
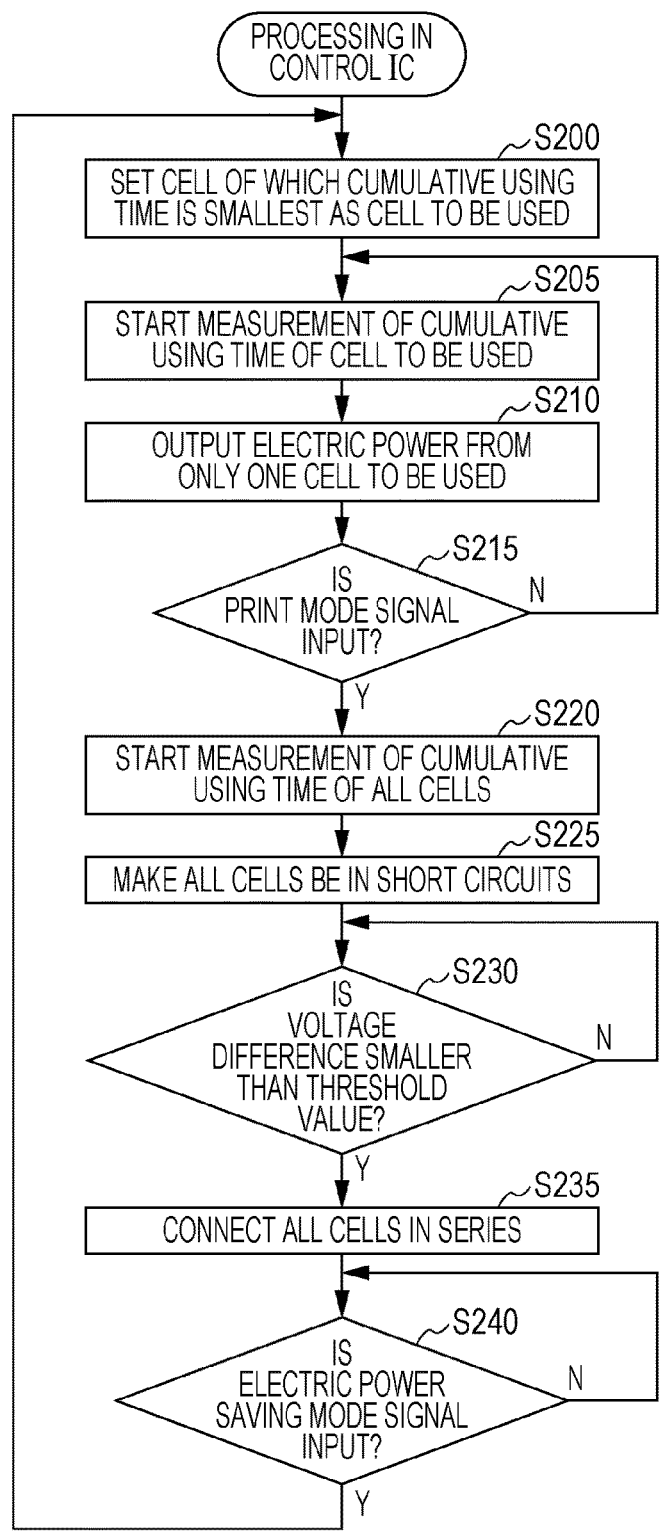
FIG. 3 is a flowchart illustrating processing in a control IC.

FIG. 3 is a flowchart illustrating processing in the control IC 22. In the present embodiment, when the printing device 10 is started to operate in a state in which the power source 20 is mounted on the printing device 10, the processing in the control IC 22 starts. In the processing in the control IC 22, the control IC 22 sets the cell of which the cumulative using time is shortest as a cell to be used (STEP S200). That is, the control IC 22 selects one cell of which the cumulative using time is shortest among the cells 21*a* to 21*d* with reference to the cumulative using time of each cells 21*a* to 21*d* according to the processing in the cumulative using time measurement unit 22*c*, and sets the selected cell as a cell to be used. The cells 21*a* to 21*d* in the present embodiment are secondary batteries, and thus, when the cumulative using time becomes long, the degree of deterioration of the cell increases. Therefore, by the cell of which the cumulative using time is shortest being set as the cell to be used, it is possible to use the cell from the cell of which the cumulative using time is short. Therefore, the cumulative using time in each of the cells $21a$ to $21d$ can be made uniform, and thus, the degrees of deterioration of the batteries can be made uniform.

Next, the control IC 22 starts the measurement of the cumulative using time of the cell to be used set in STEP S200 (STEP S205). That is, the control IC 22 starts the measurement of the using time using a measurement circuit (not illustrated) according to the processing in the cumulative using time measurement unit 22*c*, and sequentially updates the storage area in the memory in which the cumulative using time of the cell to be used is stored. Next, the control IC 22 outputs the electric power from only the cell to be used (STEP S210). That is, the control IC 22 outputs the control signal to the switches SW1 to SW11 according to the processing in the SW control unit 22*a* such that the electric power is output to the outside only by one cell set as a cell to be used. As a result, the second state is realized.

Figure 4B:
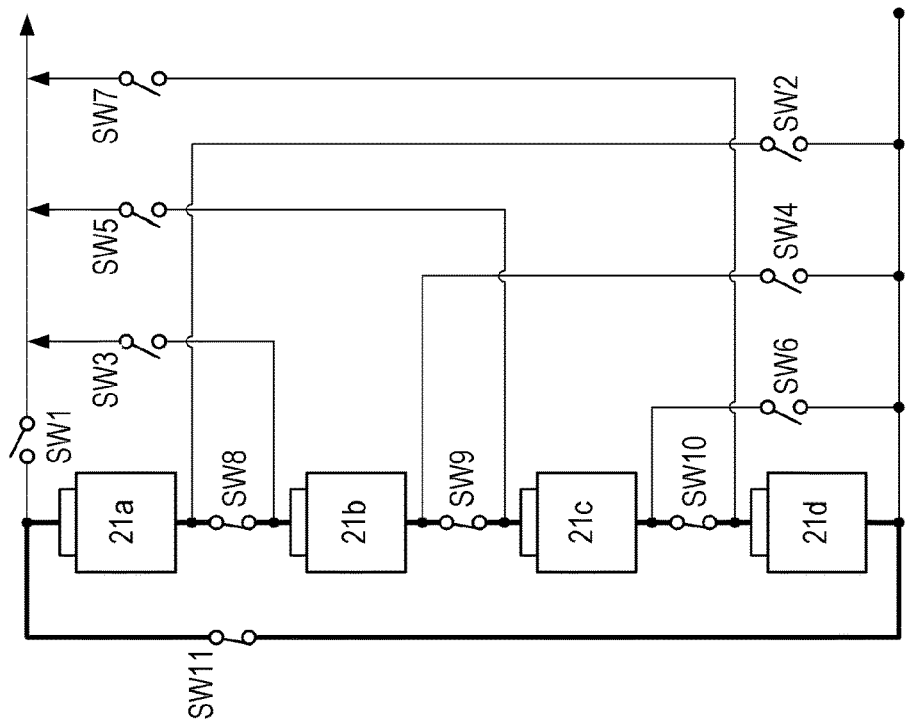
FIG. 4A is a diagram illustrating an example of a second state, and Fig, 4B is a diagram illustrating a state in which cells are in a short circuit.
Figure 4A:
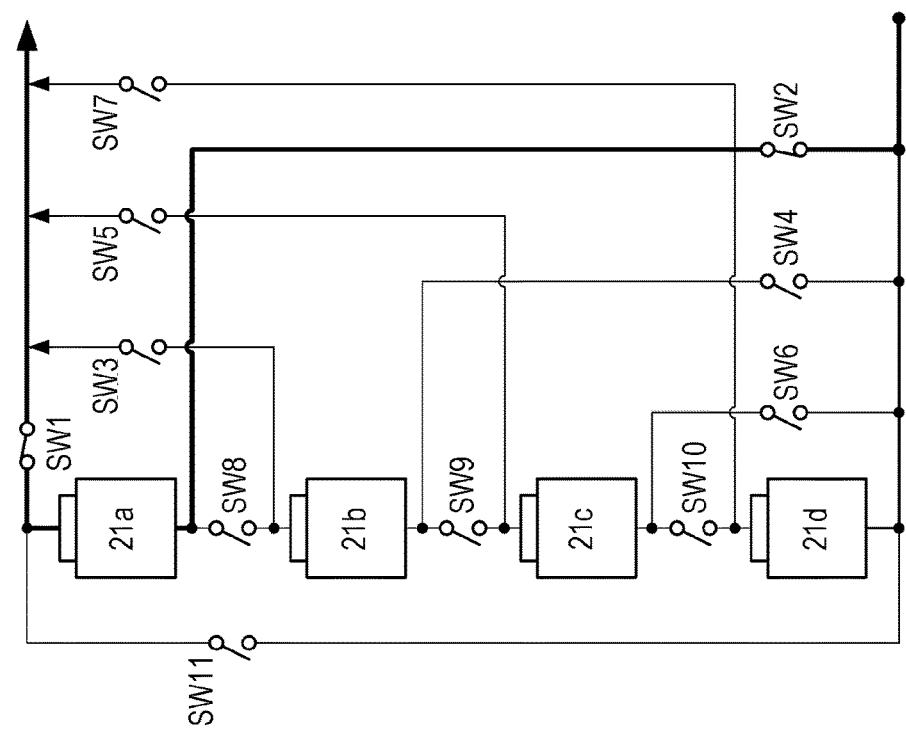

FIG. 4A to FIG. 5B are diagrams illustrating the switches SW1 to SW11, the cells $21a$ to $21d$, and the wirings thereof that are extracted from the power source 20 illustrated in FIG. 2. In a case where a cell $21a$ is set as a cell to be used in STEP S200, the control IC 22 controls the switches SW1 and W2 to be in ON states, and sets other switches to be in OFF states. As a result, as illustrated in FIG. 4A, only the wiring of bold lines are conducted, and the electric power is supplied to the outside only from the cell $21a$. Therefore, in this state, the DC power having the voltage 3 to 4 V is supplied to the outside from the cell $21a$.

As described above, in the present embodiment, at the time immediately after the printing device 10 is started to operate, the device is in the electric power saving mode in which the electric power is supplied to the outside from the power source 20 by only one cell. In addition, in the present embodiment, the processing in the control IC 22 is loop processing as described below, and thus, in a case where the mode is shifted to the electric power saving mode again after the print mode, STEP S200 is performed again through STEP S240. Therefore, again the electric power is supplied to the outside from only one cell. Of course, the processing described above is an example, and in a case where the mode is the print mode when the printing device 10 is started to operate and the predetermined time elapses without the print instruction, the mode may be shifted to the electric power saving mode.

Furthermore, the control IC 22 determines whether or not the print mode signal is input (STEP S215). That is, in a case where the user instructs the printing device to start printing through the operation unit (not illustrated), the main circuit 70 outputs the print mode signal to the power source 20 according to the processing items in STEP S100 and S130. In a case where the print mode signal is output, in STEP S215, the control IC 22 determines that the print mode signal is input. In STEP S215, in a case where it is not determined that the print mode signal is input, the control IC 22 repeats the processing items subsequent to STEP S200. That is, the printing device waits in the electric power saving mode.

In STEP S215, in a case where it is determined that the print mode signal is input the control IC 22 starts the measurement of the cumulative using time of all the cells (STEP S220). That is, the control IC 22 starts the measurement of the using time using the measurement circuit (not illustrated) according to the processing in the cumulative using time measurement unit 22*c*, and sequentially updates the storage area in which the cumulative using time of all the cells is stored.

Next, the control IC 22 makes all the cells be in short circuits (STEP S225). That is, the control IC 22 outputs the control signal to the switches SW1 to SW11 such that the cells $21a$ to $21d$ to be in short circuits by the connection in series according to the processing in the SW control unit 22*a*. Specifically, the control IC 22 controls the switches SW8 to SW11 so as to be set in ON states, and sets other switches to be in OFF states. As a result, only the wiring in bold line illustrated in FIG. 4B is conductive and the cells $21a$ to $21d$ are in short circuits by the connection in series, and thus, the voltages of all the cells $21a$ to $21d$ becomes uniform within a short time.

Next, the control IC 22 determines whether or not the voltage difference between the cells is smaller than a threshold value (STEP S230). That is, the control IC 22 acquires the voltages of the cells $21a$ to $21d$ according to the processing in the voltage detection unit 22*b* and determines whether or not the voltage difference is smaller than the threshold value based on the threshold value set in advance in order to assume that the voltages of the cells $21a$ to $21d$ are uniform. The determination may be performed in various method, for example, it may assumed that the voltages of the cells $21a$ to $21d$ become uniform in a case where the difference between a maximum value and a minimum value of the voltages of the cells $21a$ to $21d$ is smaller than the threshold value, or it may be assumed that the voltages of the cells $21a$ to $21d$ become uniform in a case where a maximum value of a deviation from an average value of the voltages of the cells $21a$ to $21d$ is smaller than the threshold value. As described above, various configurations can be adopted.

In a case where it is not determined that the voltage difference between the cells is smaller than threshold value in STEP S230, the control IC 22 repeats the processing in STEP S230. On the other hand, in a case where it is determined that the voltage difference between the cells is smaller than threshold value in STEP S230, the control IC 22 connects all the cells in series (STEP S235). That is, the control IC 22 outputs the control signal to the switches SW1 to SW11 so as to connect the cells $21a$ to $21d$ in series and supplies the electric power to the outside according to the processing in the SW control unit 22*a*. As a result thereof, the first state is realized.

Specifically, the control IC 22 controls the switches SW1 and SW8 to SW10 so as to be set in ON states, and sets other switches to be in OFF states. As a result thereof, only the wiring in bold line illustrated in FIG. 5A is conductive and the electric power is supplied to the outside in a state of the cells $21a$ to $21d$ being connected in series. Therefore, in this state, the DC power of the sum of the voltages of the cells $21a$ to $21d$, that is, the DC power of the voltage 12 V to 16 V is supplied to the outside.

Next, the control IC 22 determines whether or not the electric power saving mode signal is input (STEP S240). That is, in a case where the predetermined time elapsed without the print instruction is determined to be present, the main circuit 70 outputs the electric power saving mode signal to the power source 20 according to the processing in STEPs S110 and S120. In a case where the electric power saving mode signal is output, the control IC 22 determines that the electric power saving mode signal is input in STEP S240. In a case where it is not determined that the electric power saving mode signal is input in STEP S240, the control IC 22 repeats the processing items subsequent to STEP S240. That is, the printing device waits in the print mode. On the other hand, in a case where it is determined that the electric power saving mode signal is input in STEP S240, the control IC 22 repeats the processing items subsequent to STEP S200.

In the configuration described above, the print mode is a high load state in which the drive unit is driven and the electric power saving mode is a low load state in which the step-up circuit 40 is stopped. In the print mode, all the cells 21a to 21d are connected in series and the electric power is supplied to the outside, and in the electric power saving mode, the electric power is supplied to the outside from only one cell. Therefore, the present embodiment is provided with the configuration in which the power source 20 is switched to and from the first state in which a plurality of cells (four cells) are connected in series and the second state in which the remaining cell (one cell) is used without using a part of cells (three cells) according to the external load.

The first state realized in the print mode is a state in which, since four cells are connected in series, the maximum voltage can be obtained as an output among the voltages which can be output from the four cells. The voltage needed in the drive unit 50 of the printing device 10 is 42 V, and the number of cells included in the power source 20 is four. This voltage and the number of cells can be determined as specific values at the design stage considering the costs. The voltage that can be output from the four cells is "a voltage of a single cell" to "a voltage of a single cell×four", that is, approximately 4 V to 16 V which is lower than 42 V.

Therefore, in the print mode, the printing device 10 steps up the output voltage of the power source 20 using the step-up circuit 40. However, in this case, generally, the electric power conversion efficiency increases as the voltage difference between before and after the conversion decreases (the loss decreases). Therefore, in the present embodiment in which all (four) the plurality of cells connected in series in the first state, the maximum value of the voltage obtainable from four cells is output to the outside. Therefore, it is possible to supply the electric power to the load by performing the conversion at the highest electric power conversion efficiency among the electric power conversion efficiency obtainable from four cells.

Furthermore, since three cells are not used in the second state, it is possible to prevent the deterioration in the three cells. In addition, the electric power of those cells can be made not be consumed.

Second Embodiment

3. Configuration of a Printing Device

Figure 6A:
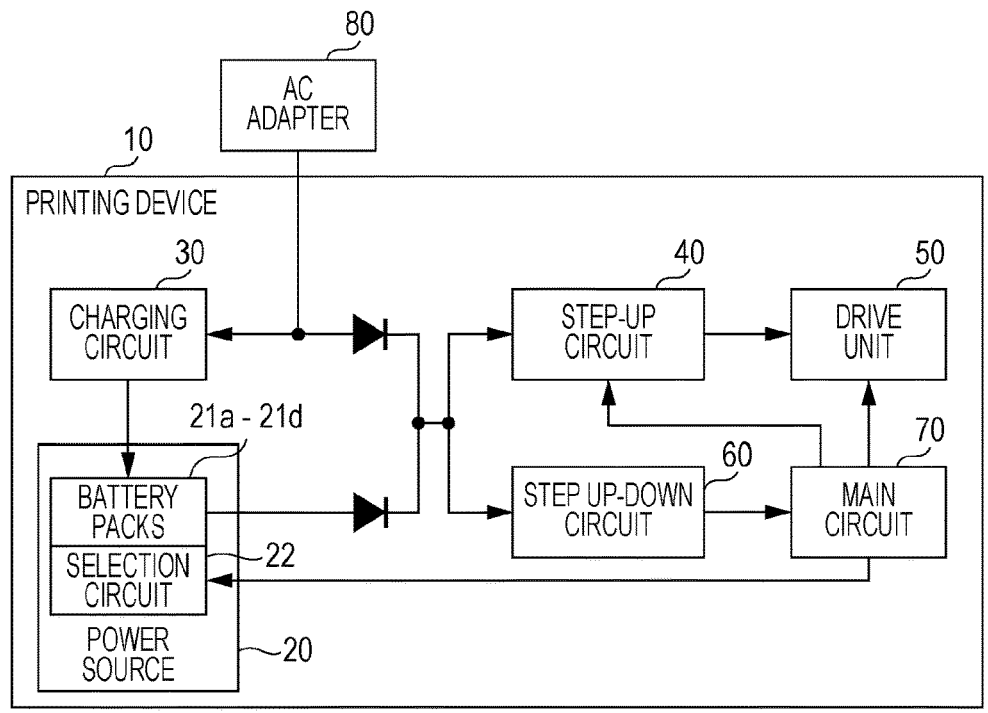
FIG. 6A is a block diagram illustrating a printing device that includes a power source in the second embodiment.

FIG. 6A is a block diagram illustrating a printing device 10 driven by a power source 20 in another embodiment of the present invention. The printing device 10 includes a mounting portion (not illustrated) that can mount the power source 20 and a connection terminal to an AC adapter 80, and is driven by receiving the electric power from the power source 20 connected to the mounting portion or the AC adapter 80 connected to the connection terminal.

The printing device 10 illustrated in FIG. 6A includes a power source 20, a charging circuit 30, a step-up circuit 40, a drive unit 50, a step up-down circuit 60, and a main circuit 70. The AC adapter 80 includes a circuit that receives an AC power from a commercial power source and converts the AC power to a DC power having a predetermined voltage.

The power source 20 includes battery packs 21a to 21d and a selection circuit 22. In the present embodiment, the power source 20 includes four battery packs 21a to 21d (refer to FIG. 7), and each battery packs 21a to 21d includes a plurality of cells (not illustrated) (in the present embodiment, lithium ion batteries as secondary batteries described below, but not limited thereto) which are connected in series or in parallel. In the present embodiment, the four battery packs 21a to 21d have the same specifications and can output DC power having a predetermined range of voltages. That is, the output voltage of each battery packs 21a to 21d fluctuates within a predetermined range in accordance with the remaining amount of electric power of each battery packs 21a to 21d.

The selection circuit 22 includes a circuit for selecting the battery packs to be used, selects the battery packs to be used in accordance with the voltage or the like of the battery packs, and switches the circuits such that the selected battery packs are connected in a predetermined connection mode (details will be described below). Therefore, in the present embodiment, the power source 20 outputs the DC power having the voltage depending on the number of selected battery packs and the connection mode. The power source 20 is connected to the step-up circuit 40 and the step up-down circuit 60 via a diode.

The charging circuit 30 is connected to the AC adapter 80 and the power source 20, and includes a circuit for charging the battery packs using the electric power supplied from the AC adapter 80. The plurality of battery packs included in the power source 20 is charged based on the output from the charging circuit 30, and various types triggering for starting the charging can be assumed. For example, the triggering can be made when the user operates the operation unit (not illustrated), when the AC adapter 80 is connected to the printing device 10, and when a predetermined time has elapsed without performing the printing in a state in which the AC adapter 80 is connected to the printing device 10.

The step-up circuit 40 is a circuit that steps the voltage of the input electric power up to a predetermined voltage and outputs the result, and output wirings of the AC adapter 80 and the power source 20 are connected to the step-up circuit 40 via diodes. In addition, the output wiring of the step-up circuit 40 is connected to the drive unit 50, and thus, the output electric power from the step-up circuit 40 is supplied to the drive unit 50. The predetermined voltage in the present embodiment is a voltage necessary for driving the drive unit 50, and is higher than a maximum voltage of the power source 20 and the output voltage of the AC adapter 80. Therefore, in the present embodiment, the output voltage of the AC adapter 80 or the output voltage of the power source 20 is stepped up to a predetermined voltage though the step-up circuit 40, and the electric power having the predetermined voltage is supplied to the drive unit 50. The step-up circuit 40 is configured to receive a control signal from the main circuit 70, and the main circuit 70 can stop the operation of the step-up circuit 40 using the control signal.

The drive unit 50 is a part driven for realizing the printing in the printing device 10 and includes a printing head, a carriage, a printing medium transport device, and the like (not illustrated). In the present embodiment, the drive unit 50 is driven by configuration elements such as a piezo-element and a motor. That is, each configuration element is driven by the electric power output from the step-up circuit 40 being supplied to each configuration element. The control signal is input to the drive unit 50 from the main circuit 70 and the drive timing or the like is controlled by the control signal.

The step up-down circuit 60 is a circuit that converts (step-up or step-down the voltage of the input electric power) to the predetermined voltage and outputs the result, and the output wirings of the AC adapter 80 and the power source 20 are connected step up-down circuit 60 via the diodes. In addition, the output wiring of the step up-down circuit 60 is connected to the main circuit 70, and thus, the output electric power of the step up-down circuit 60 is supplied to the main circuit 70. Therefore, the step up-down circuit 60 steps the output voltage of the AC adapter 80 or the output voltage of the power source 20, and supplies electric power having the predetermined voltage to the main circuit 70. In the present embodiment, the predetermined voltage of the electric power supplied to the main circuit 70 is lower than the predetermined voltage of the electric power supplied to the drive unit 50 (for example, the voltage of the drive unit 50 is 42 V while the voltage of the main circuit 70 is 3.3 V).

The main circuit 70 includes the control unit having a (not illustrated) CPU, a memory, and the like, and can executes a predetermined program for performing the printing. In the present embodiment, the main circuit 70 includes an interface to a (not illustrated) operation unit or an external device, acquires information indicating the print target from the external device (a memory, a computer, or the like) according to the user's operation of the operation unit, performs predetermined processing to generate a print image, and appropriately controls the drive unit 50 to print the print image on a print medium.

When performing the printing by driving the drive unit 50, the main circuit 70 supplies the electric power having predetermined voltage to the drive unit 50 without stopping the step-up circuit 40, and this state will be referred to as a print mode in this specification. In a case where a predetermined time set in advance elapses without the drive unit 50 being driven, the main circuit 70 outputs the control signal to the step-up circuit 40 to stop the step-up circuit 40. In this case, the electric power for generating the voltage that is a relatively high voltage compared to the voltage supplied to the main circuit 70 is not supplied to the step-up circuit 40 from the power source 20 or the AC adapter 80. Therefore, this state is a state in which the consumption of electric power is less than that in the print mode, and this state is referred to as an electric power saving mode.

The main circuit 70 can control the stop or non-stop of the step-up circuit 40 and the drive timing of the drive unit 50, and additionally, can control the power source 20. That is, the main circuit 70 and the power source 20 are connected to each other through a signal line, and thus, the main circuit 70 can output a signal (a print mode signal) indicating that the current time is in the print mode and a signal (an electric power saving mode signal) indicating that the current time is in the electric power saving mode to the power source 20 via the signal line.

4. Configuration of the Power Source

Figure 7:
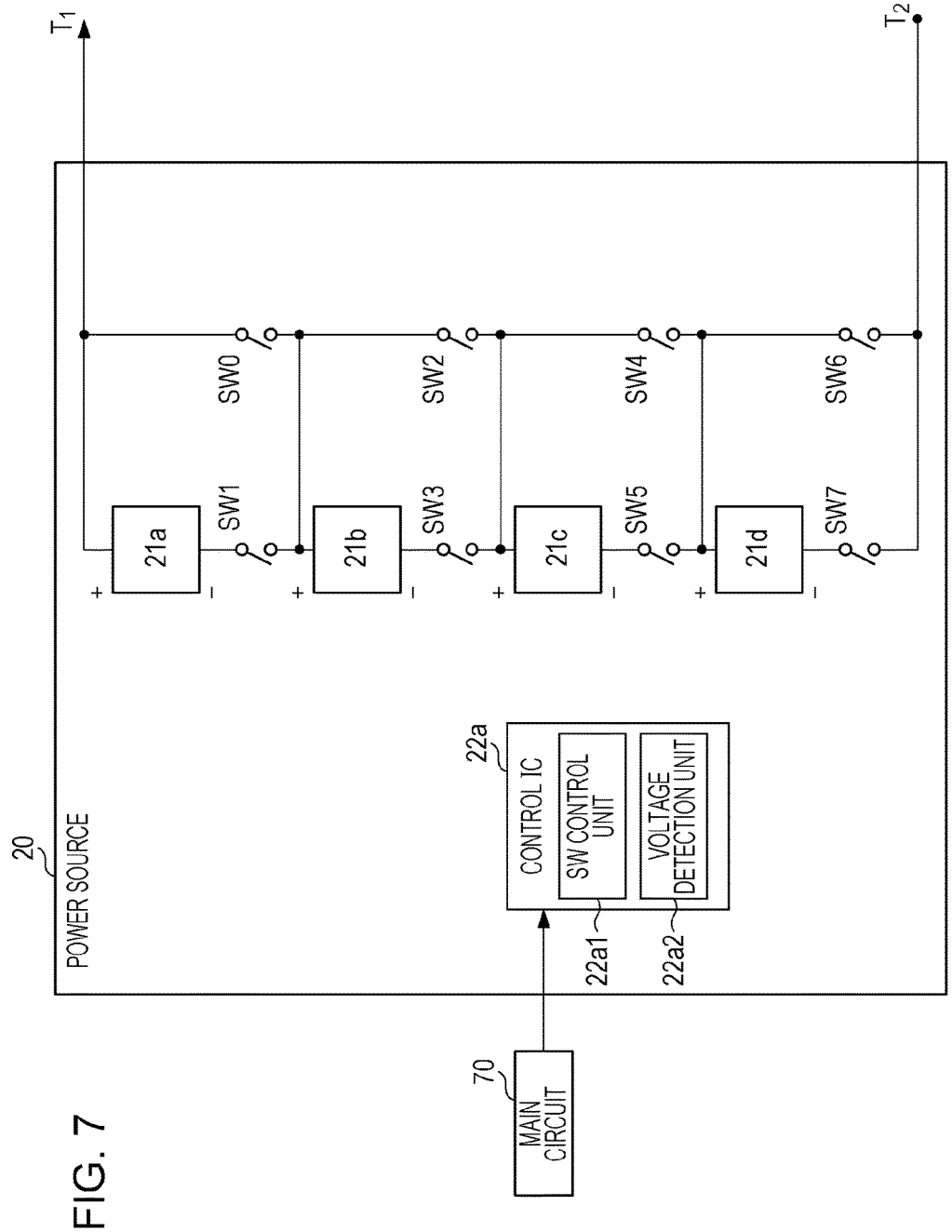
FIG. 7 is a diagram illustrating a configuration of the power source.

The power source 20 is configured to select the battery packs to be used in accordance with the battery packs 21*a* to 21*d* and the above-described modes (the print mode and the electric power saving mode). FIG. 7 is a block diagram illustrating the internal configuration of the power source 20. The power source 20 includes the battery packs 21*a* to 21*d*, a control IC 22*a*, and switches SW0 to SW7.

The control IC 22*a* includes a control unit having a (not illustrated) CPU, a memory, and the like), and can perform a predetermined function by executing a program recorded in advance in a ROM. In the present embodiment, the program includes a program module such as a SW control unit 22*a*1 and a voltage detection unit 22*a*2, and the SW control unit 22*a*1 causes the control IC 22*a* to realize a function of controlling the switches SW0 to SW7. That is, the switches SW0 to SW7 are the switches that can electrically switch the ON and OFF state (for example, a MOS-FET or the like), and the control IC 22*a* can set the ON or OFF state of the switches SW0 to SW7 according to the processing in the SW control unit 22*a*1 via the signal line (not illustrated).

The voltage detection unit 22*a*2 causes the control IC 22*a* to realize the function of detecting the voltage of the battery packs 21*a* to 21*d*. That is, the control IC 22*a* includes a (not illustrated) A/D converter and wirings, and the control IC 22*a* can acquire the voltages of the battery packs 21*a* to 21*d* which are converted by the A/D converter from analog values to digital values according to the processing in the voltage detection unit 22*a*2.

The switches SW0 to SW7 are wired such that the electric power can be supplied to the outside using one or a plurality of packs selected from the battery packs 21*a* to 21*d*. That is, the switches SW0, SW2, SW4, and SW6 are connected in series between the external terminals T1 and T2. In addition, the battery pack 21*a*, the switch SW1, the battery pack 21*b*, the switch SW3, the battery pack 21*c*, the switch SW5, the battery pack 21*d*, and the switch SW7 are connected in series between the external terminals T1 and T2.

Furthermore, a wiring is provided such that the wiring between the switch SW0 and the switch SW2 is electrically conductive with the wiring between the switch SW1 and the positive electrode of the battery pack 21*b*. In addition, a wiring is provided such that the wiring between the switch SW2 and the switch SW4 is electrically conductive with the wiring between the switch SW3 and the positive electrode of the battery pack 21*c*. Furthermore, a wiring is provided such that the wiring between the switch SW4 and the switch SW6 is electrically conductive with the wiring between the switch SW5 and the positive electrode of the battery pack 21*d*.

In the present embodiment, the power source 20 switches the battery packs to be used using the control IC 22*a* and the switches SW0 to SW7 according to the voltages of the battery packs 21*a* to 21*d* and the external load (any of the print mode or the electric power saving mode). Therefore, the control IC 22*a* and the switches SW0 to SW7 functions as a selection circuit. Here, the switching of the battery packs according to the processing in the main circuit 70 and the processing in the control IC 22*a* will be described in detail.

4-1. Processing in the Main Circuit

Figure 6B:
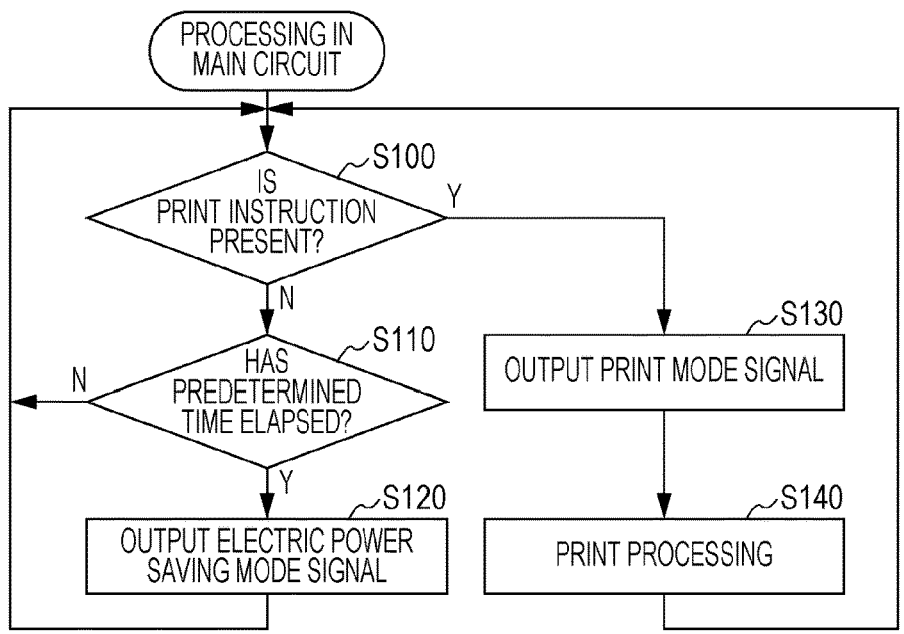
FIG. 6B is a flowchart illustrating processing in a main circuit.

FIG. 6B is a flowchart illustrating processing in the main circuit 70. When the printing device 10 is started to operate, even in a state in which the electric power is supplied from any one of the power source 20 and the AC adapter 80, the electric power having a voltage to be supplied to the main circuit 70 is generated by the step up-down circuit 60. When the electric power is output from the step up-down circuit 60, the main circuit 70 performs the processing in the main circuit illustrated in FIG. 6B.

In the processing, the main circuit 70 determines whether or not the print instruction is present (STEP S100). That is, in a case where there is a user's instruction to start the printing through the operation unit (not illustrated), the main circuit 70 determines that the print instruction is present. In a case where it is not determined that the print instruction is present in STEP S100, the main circuit 70 determines whether or not a predetermined time elapses without the determination that the instruction is present (STEP S110). That is, in a case where it is not determined that the print instruction is present in STEP S100, the main circuit 70 starts to measure the elapsed time using a clock circuit (not illustrated). In a case where the result of measurement is equal to or greater than the predetermined time (a time regulated in advance as a waiting time for being shifted to the electric power saving mode), the main circuit 70 determines that the predetermined time elapsed.

In a case where it is not determined that the predetermined time elapsed in STEP S110, the main circuit 70 repeats the processing items subsequent to STEP S100. On the other hand, in a case where it is determined that the predetermined time elapsed in STEP S110, the main circuit 70 outputs the electric power saving mode signal (STEP S120). That is, the main circuit 70 outputs a signal indicating that the current time is in the electric power saving mode to the power source 20. In addition, the main circuit 70 outputs the control signal to the step-up circuit 40 to stop the step-up circuit 40. Then, the main circuit 70 repeats the processing items subsequent to STEP S100.

On the other hand, in a case where it is determined that the print instruction is present in STEP S100, the main circuit 70 outputs the print mode signal (STEP S130). That is, the main circuit 70 outputs the signal indicating that the current time is in the print mode to the power source 20. Next, the main circuit 70 performs the print processing (STEP S140). That is, the main circuit 70 outputs the control signal to the step-up circuit 40 to cause the step-up circuit 40 to be in a non-stop state. As a result, the electric power having the predetermined voltage is output from the step-up circuit 40. In addition, the main circuit 70 specifies a print target according to the operation of the operation unit by the user, and performs predetermined processing to generate a print image. Furthermore, the main circuit 70 outputs the control signal to the drive unit 50 and drives the print head, the carriage, the printing medium transport device, or the like to print the print image. When the print processing ends, the main circuit 70 repeats the processing items subsequent to STEP S100.

4-2. Processing in the Control IC

Figure 8:
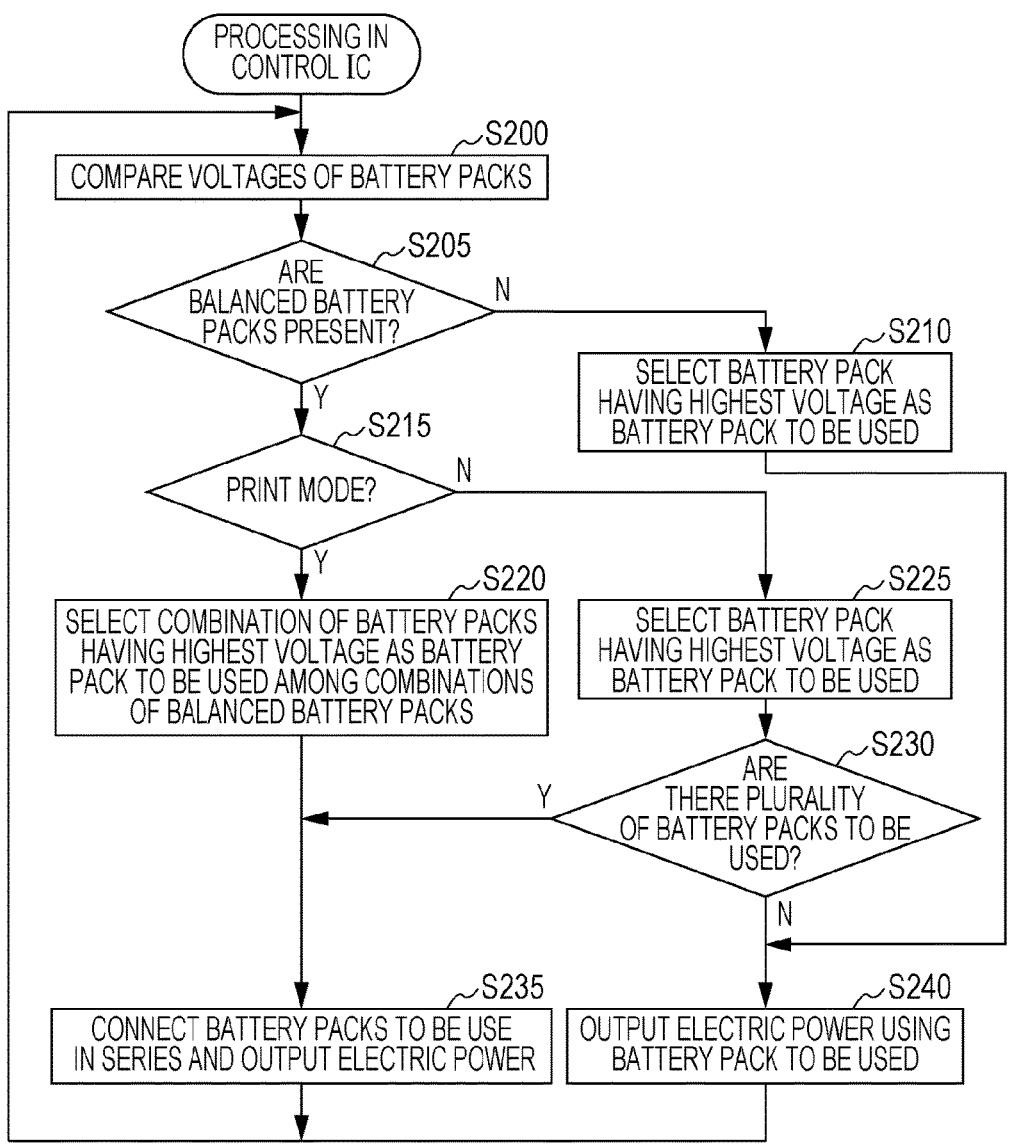
FIG. 8 is a flowchart illustrating processing in a control IC.

FIG. 8 is a flowchart illustrating processing in the control IC 22a. In the present embodiment, when the printing device 10 is started to operate in a state in which the power source 20 is mounted on the printing device 10, the processing in the control IC 22a starts. In the processing in the control IC 22a, the control IC 22a compares the voltages of the battery packs (STEP S200). That is, the control IC 22a acquires the voltages of the battery packs 21a to 21d according to the processing in the voltage detection unit 22a2, specifies two combinations selected from each of the battery packs 21a to 21d with regard to all the cases, and acquires the voltage difference in each of the cases.

Next, the control IC 22a determines whether or not the balanced battery packs are present (STEP S205). That is, the control IC 22a determines whether or not the combination of the battery packs of which the voltage difference is equal to or smaller than a threshold value according to the processing in the voltage detection unit 22a2. In a case where the combination of the battery packs of which the voltage difference equal to or smaller than the threshold value presents, the control IC 22a regards the combination as the balanced battery packs.

In addition, in a case where a first battery pack is balanced with a second battery pack and the second battery pack is balanced with a third battery pack, the control IC 22a specifies the combination even in a case where three or more balanced battery packs are present according to the processing for regarding that the first battery to the third battery are balanced. The threshold value is a value defined in advance for determining whether or not the voltage difference decreases as the voltages are regarded as the same.

In STEP 205, in a case where it is not determined that the balanced battery packs are not present, the control IC 22a selects the battery pack having the highest voltage as the battery pack to be used (STEP S210). That is, in a case where the balanced battery packs are not present, the voltage values of four battery packs 21a to 21d are all different from each other. Therefore, the control IC 22a compares the voltages of the battery packs 21a to 21d, and selects the battery pack having the highest voltage as the battery pack to be used.

On the other hand, in a case where it is determined that the balanced battery packs are present in STEP S205, the control IC 22a determines whether or not the current time is in the print mode (STEP S215). That is, in a case where the user instructs the printing device to start printing through the operation unit (not illustrated), the main circuit 70 outputs the print mode signal to the power source 20 according to the processing items in STEP S100 and S130. Therefore, in a case where the signal finally output from the main circuit 70 is the print mode signal, the control IC 22a determines that the current time is in the print mode, that is, determines that the load on the printing device 10 is high.

In a case where it is determined that the current time is in the print mode in STEP S215, that is, in a case where the load on the printing device 10 is high (the outside of the power source 20 requires the high voltage), the control IC 22a selects the combination of the battery packs having the highest voltage among the combinations of the balanced battery packs as the battery packs to be used (STEP S220). That is, since STEP S220 is performed in a case where at least one combination of the balanced battery packs is present, if one combination of the balanced battery packs is present, the control IC 22a selects that combination and selects that battery pack as the battery pack to be used. On the other hand, if a plurality of combinations (two combinations in the present embodiment) of the balanced battery packs are present, the control IC 22a selects the combination of the battery packs having the highest voltage among the combinations, and selects that battery pack as the battery pack to be used.

On the other hand, in a case where it is not determined that the current time is in the print mode in STEP S215, that is, in a case where it is determined that the load on the printing device 10 is low (the outside of the power source 20 requires the low voltage), the control IC 22a selects the battery pack having the highest voltage as the battery pack to be used (STEP S225). That s, the control IC 22a compares the voltages of the battery packs 21a to 21d and selects the battery pack having the highest voltage as the battery pack to be used. Since STEP S225 is performed in a case where at least one combination of the balanced battery packs is present, in a case where the battery pack having the highest voltage is included in the balanced battery packs, the control IC 22a selects the combination of the balanced battery packs as the battery pack to be used.

Next, the control IC 22a determines whether or not there are a plurality of battery packs to be used (STEP S230). In a case where it is determined that there are a plurality of battery packs to be used in STEP S230, or STEP S220 is performed, the control IC 22a connects the battery packs to be used in series and the outputs the electric power (STEP S235). In the present embodiment, in order to connect the combination of the arbitrary battery packs in series, the switches for ON and the switches for OFF are specified in advance.

Therefore, in order to connect the battery packs to be used in series, the control IC 22a sets the ON state by outputting the control signal to the switches for ON and sets the OFF states by outputting the control signal to the switches for OFF according to the processing in the SW control unit

22a1. The situation in which it is determined that there are a plurality of battery packs to be used in STEP S230 occurs in a situation of low load (not in the print mode), and the required voltage is low. Therefore, the battery packs to be used may be connected in parallel in STEP S235 or one battery pack having the highest voltage may be used.

On the other hand, in a case where STEP S210 is performed or in a case where it is not determined that there are a plurality of battery packs to be used in STEP S230, the control IC 22a outputs the electric power using the battery pack to be used (STEP S240). That is, since STEP S240 is performed in a case where there is one battery pack to be used, in order to output the electric power from the battery pack, the control IC 22a sets the ON state by outputting the control signal to the switch for ON and sets the OFF state by outputting the control signal to the switch for OFF according to the processing in the SW control unit 22a1.

According to the processing described above, in a case where the balanced battery packs are present, the combinations of the battery packs having the highest voltage among the balanced battery packs are connected in series in the print mode, and in case where the battery packs having the highest voltages are balanced in the electric power saving mode, those batteries are connected in series. Therefore, the movement of the electric charges does not occur (or the movement occurs extremely small) between the batteries when connecting those battery packs in series, and thus, the electric power loss due to the movement of the electric charges can be suppressed.

In the present embodiment, the predetermined voltage applied to the drive unit 50 is higher than the maximum voltage (the voltage obtainable by connecting the battery packs 21a to 21d in series) of the power source 20. Therefore, in the print mode in which the load is high, the output voltage of the power source 20 is stepped-up by the step-up circuit 40. The voltage obtainable by connecting the balanced battery packs in series is the maximum voltage that can be obtained using these battery packs. In the print mode in the present embodiment, since the balanced battery packs are connected in series and used, the maximum voltage that can be output in a combination of the balanced battery packs is output from the power source 20. In the voltage conversion in the step-up circuit 40, since the electric power conversion efficiency increases (the loss decreases) as the voltage difference between before and after the conversion decreases, according to the present embodiment in which the maximum voltage that can be output in a combination of the balanced battery packs is output from the power source 20, it is possible to supply the electric power to the load by performing the conversion at the highest electric power conversion efficiency obtainable in a combination of the balanced battery packs.

Furthermore, according to the processing described above, if the battery packs are balanced, in the electric power saving mode in which the load is low, the battery packs having the maximum voltage are preferentially used, and furthermore, if the battery packs having the maximum voltage are balanced, the plurality of batteries packs are used. That is, in the electric power saving mode, the battery having the highest voltage is selected. According to this configuration, in the electric power saving mode, it is possible to supply the electric power to the outside with the batteries having largest amount of remaining electric power and having the longest usable term.

Furthermore, according to the processing described above, in a case where the voltage decreases by using a certain battery pack and the voltage difference between the battery pack and other battery packs becomes equal to or less than the threshold value, the battery packs and other battery pack are connected in series. Therefore, in the operation process of the power source, it is possible to shift to the situation in which the electric power is supplied to the load by performing the conversion at the high electric power conversion efficiency while suppressing the loss of the electric power.

5. Examples of Selecting Battery Packs

Next, examples of selecting the battery packs will be described. FIG. 9A to FIG. 14B are diagrams illustrating the switches SW0 to SW7, the battery packs 21a to 21d, and the wirings thereof that are extracted from the power source 20 illustrated in FIG. 7. In these figures, the relative relationship between the voltages of the battery packs are illustrated in the block illustrating the battery packs. In addition, the conductive wiring is illustrated by the bold lines.

Figure 9A:
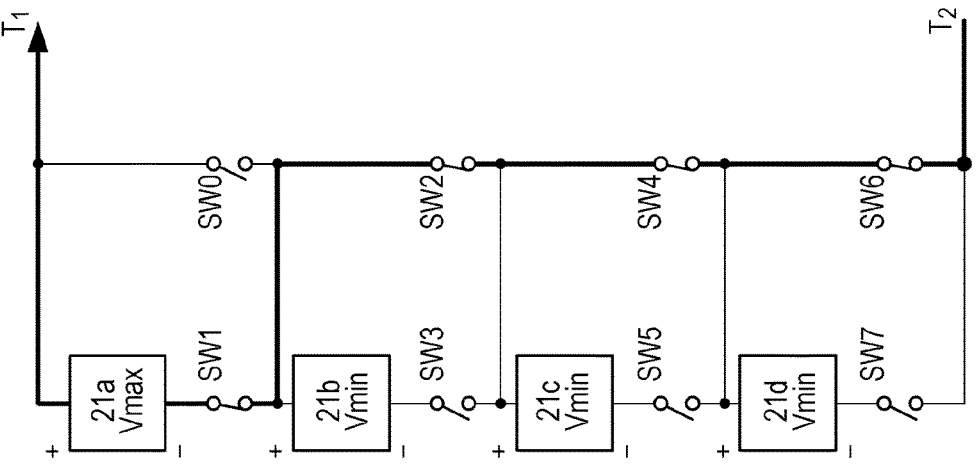
FIG. 9A to FIG. 9C are diagrams illustrating examples of selecting battery packs.

FIG. 9A illustrates an example in which the voltage of the battery pack 21a is a maximum value Vmax and the voltages of the battery packs 21b to 21d are minimum value Vmin. When a situation in this example occurs in the electric power saving mode, in the processing illustrated in FIG. 8, the control IC 22a determines through the processing items in STEPs S200 and 205 that the battery packs 21b to 21d are balanced, and determines that the printing device is not in the print mode in STEP S215.

As a result thereof, in STEP S225, the control IC 22a selects the battery pack 21a having the highest voltage as the battery pack to be used, and performs STEP S240 through STEP S230. That is, as illustrated in FIG. 9A, the control IC 22a sets the switches SW1, SW2, SW4, and SW6 to be in ON states, and sets the switches SW0, SW3, SW5, and SW7 to be in OFF states. As a result, the power source 20 supplies the electric power from the battery pack to be used 21a.

On the other hand, when the situation in which the voltage of the battery pack 21a is a maximum value Vmax and the voltages of other battery packs 21b to 21d are minimum value Vmin occurs in the print mode, in the processing illustrated in FIG. 8, the control IC 22a determines through STEPs S200 that the battery packs 21b to 21d are balanced and 205, and determines that the printing device is in the print mode in STEP S215.

Figure 9B:
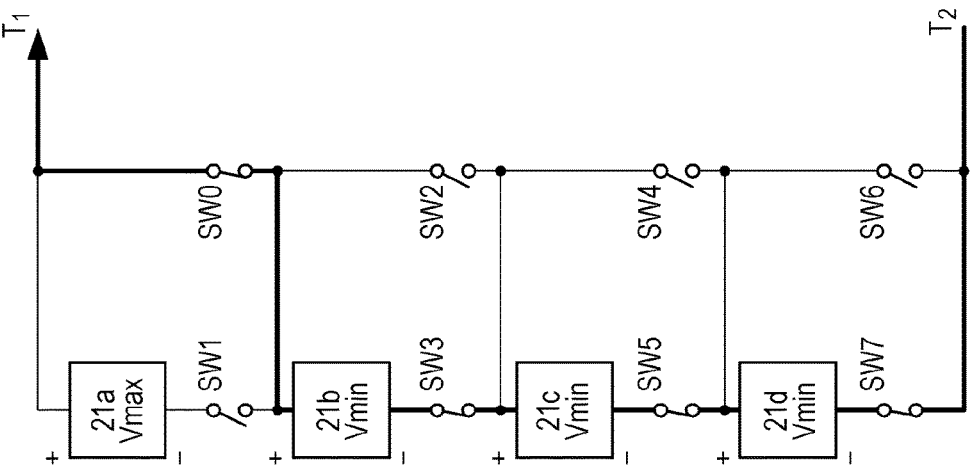

As a result, in STEP S220, the control IC 22a selects the combination of the battery packs (battery packs 21b to 21d) having the highest voltage as the battery pack to be used, and performs STEP S235. That is, as illustrated in FIG. 9B, the control IC 22a sets the switches SW0, SW3, SW5, and SW7 to be in ON states, and sets the switches SW1, SW2, SW4, and SW6 to be in OFF states. As a result, the power source 20 connects the battery packs to be used 21b to 21d in series and supplies the electric power.

The situation illustrated in FIG. 9A which is realized in the electric power saving mode continues and when the voltage of the battery pack 21a reaches Vmin, in the processing illustrated in FIG. 8, the control IC 22a determines through STEPs S200 and 205 that the battery packs 21a to 21d are balanced and determines that the printing device is not in the print mode in STEP S215.

Figure 9C:
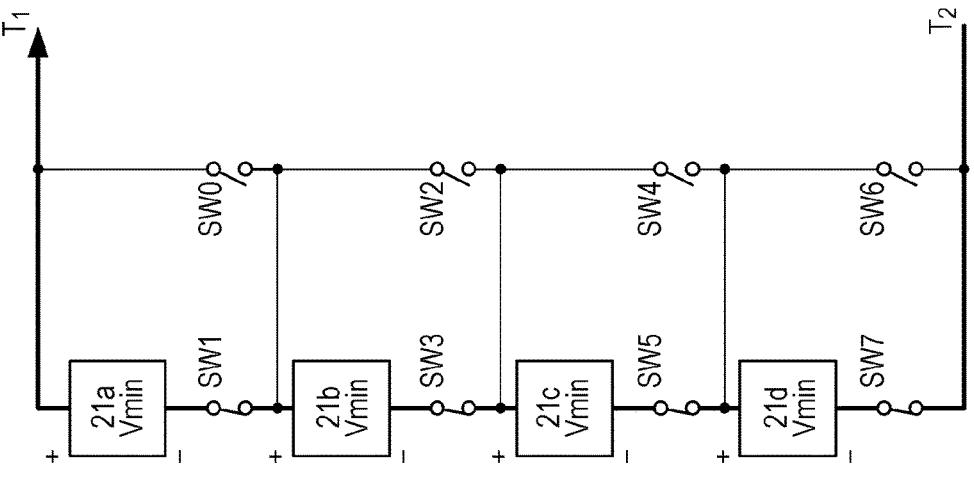

As a result thereof, in STEP S225, the control IC 22a selects the battery packs (the battery packs 21a to 21d) having the highest voltage as the battery packs to be used, and performs STEP S240 through STEP S230. That is, as illustrated in FIG. 9C, the control IC 22a sets the switches SW1, SW3, SW5, and SW7 to be in ON states, and sets the switches SW0, SW2, SW4, and SW6 to be in OFF states. As a result, the power source 20 supplies the electric power by connecting the battery packs 21a to 21d to be used in series.

Figure 10B:
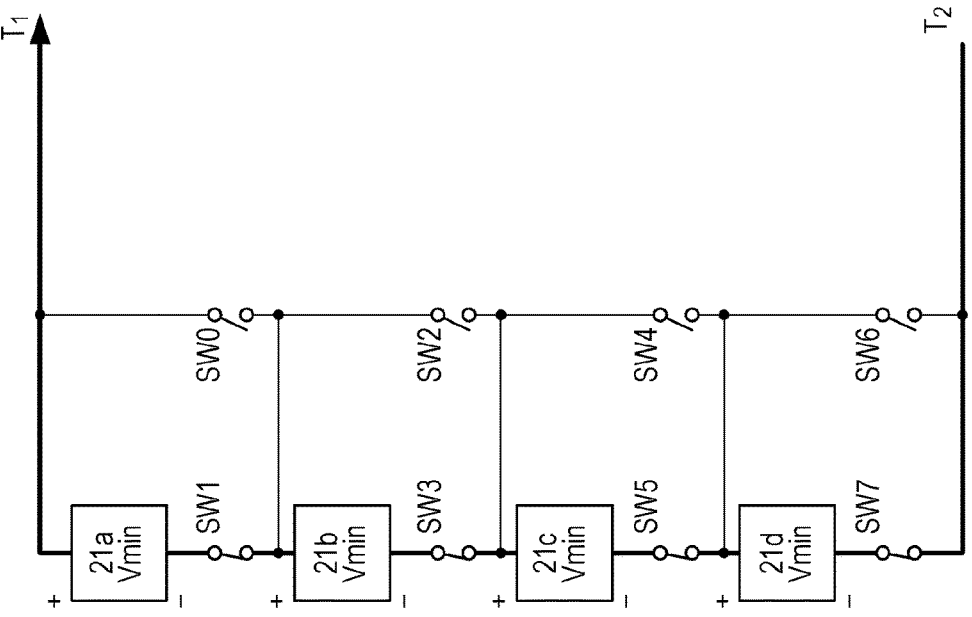
FIG. 10A to FIG. 10B are diagrams illustrating examples of selecting battery packs.
Figure 10A:
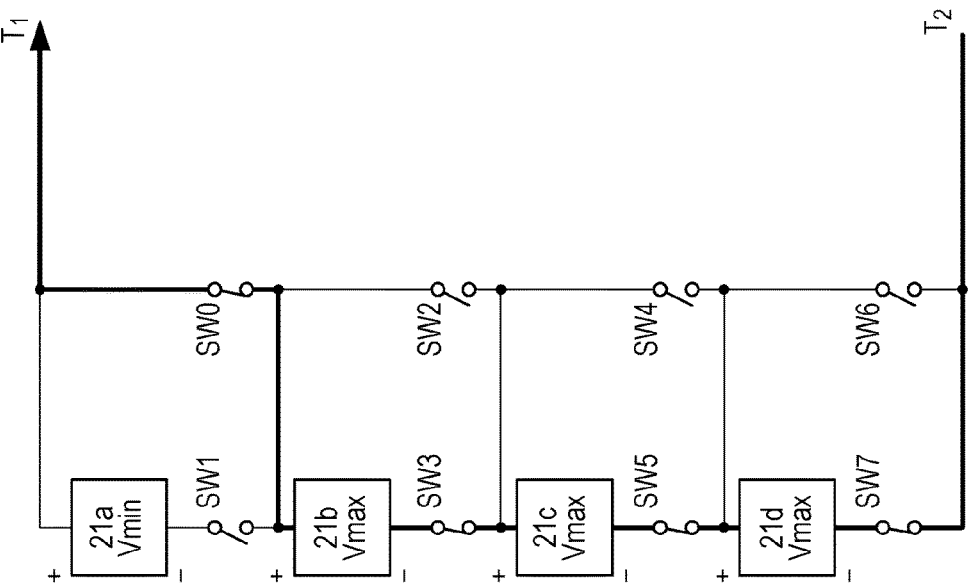

FIG. 10A illustrates an example in which the voltage of the battery pack 21a is a minimum value Vmin and the voltages of the battery packs 21b to 21d are maximum value Vmax. When a situation in this example occurs in the electric power saving mode, in the processing illustrated in FIG. 8, the control IC 22a determines through the processing items in STEPs S200 and S205 that the battery packs 21b to 21d are balanced, and determines that the printing device is not in the print mode in STEP S215.

As a result thereof, in STEP S225, the control IC 22a selects the battery packs 21b to 21d having the highest voltage as the battery packs to be used, and performs STEP S235 through STEP S230. That is, as illustrated in FIG. 10A, the control IC 22a sets the switches SW0, SW3, SW5, and SW7 to be in ON states, and sets the switches SW1, SW2, SW4, and SW6 to be in OFF states. As a result, the power source 20 supplies the electric power by connecting the battery packs 21b to 21d to be used in series.

On the other hand, when the situation in which the voltage of the battery pack 21a is a minimum value Vmin and the voltages of other battery packs 21b to 21d are maximum value Vmax occurs in the print mode, in the processing illustrated in FIG. 8, the control IC 22a determines through STEPs S200 and S205 that the battery packs 21b to 21d are balanced, and determines that the printing device is in the print mode in STEP S215.

As a result, in STEP S220, the control IC 22a selects the combination of the battery packs (battery packs 21b to 21d) having the highest voltage as the battery packs to be used, and performs STEP S235, and then, realizes the situation illustrated in FIG. 10A. That is, in a case where the voltage of only one battery pack is low and the voltages of other battery packs are balanced, the control IC 22a supplies the electric power by connecting the balanced battery packs in series regardless of the load of the printing device 10.

The situation illustrated in FIG. 10A continues and when the voltages of the battery packs 21b to 21d reach Vmin, in the processing illustrated in FIG. 8, the control IC 22a determines through STEPs S200 and S205 that the battery packs 21a to 21d are balanced and performs STEP S220 or STEP S225 through STEP S215. Since the battery packs 21a to 21d are selected in STEPs described above as the battery packs to be used, the control IC 22a sets the switches SW1, SW3, SW5, and SW7 to be in ON states, and sets the switches SW0, SW2, SW4, and SW6 to be in OFF states as illustrated in FIG. 10B in STEP S235. As a result, the power source 20 supplies the electric power by connecting the battery packs 21a to 21d to be used in series.

FIG. 11A illustrates an example in which the voltages of the battery packs 21a and 21b are maximum value Vmax and the voltages of the battery packs 21c and 21d are V1 and V2 respectively. Here, Vmax>V1>V2. When a situation in this example occurs in the electric power saving mode, in the processing illustrated in FIG. 8, the control IC 22a determines through the processing items in STEPs S200 and S205 that the battery packs 21a and 21b are balanced, and determines that the printing device is not in the print mode in STEP S215.

As a result thereof, in STEP S225, the control IC 22a selects the battery packs 21a and 21b having the highest voltage as the battery packs to be used, and performs STEP S235 through STEP S230. That is, as illustrated in FIG. 11A, the control IC 22a sets the switches SW1, SW3, SW4, and SW6 to be in ON states, and sets the switches SW0, SW2, SW5, and SW7 to be in OFF states. As a result, the power source 20 supplies the electric power by connecting the battery packs 21a and 21b to be used in series.

On the other hand, when the situation in which the voltage of the battery packs 21a and 21b is the maximum value Vmax and the voltages of other battery packs 21c and 21d are respectively V1 and V2 occurs in the print mode, in the processing illustrated in FIG. 8, the control IC 22a determines through STEPs S200 and 205 that the battery packs 21a and 21b are balanced, and determines that the printing device is in the print mode in STEP S215.

As a result, in STEP S220, the control IC 22a selects the combination of the battery packs (battery packs 21a and 21b) having the highest voltage as the battery packs to be used, and performs STEP S235, and then, realizes the situation illustrated in FIG. 11A. That is, in a case where the voltages of the plurality of battery packs are the maximum values and the voltages are balanced and the voltage of other battery packs are low, the control IC 22a supplies the electric power by connecting the balanced battery packs in series regardless of the load of the printing device 10.

Furthermore, the situation illustrated in FIG. 11A continues and when the voltages of the battery packs 21a and 21b reach V1, in the processing illustrated in FIG. 8, the control IC 22a determines through STEPs S200 and 205 that the battery packs 21a to 21c are balanced and performs STEP S220 or STEP S225 through STEP S215. Since the battery packs 21a to 21c are selected in STEPs described above as the battery packs to be used, the control IC 22a sets the switches SW1, SW3, SW5, and SW7 to be in ON states, and sets the switches SW0, SW2, SW4, and SW6 to be in OFF states as illustrated in FIG. 11B in STEP S235. As a result, the power source 20 supplies the electric power by connecting the battery packs 21a to 21c to be used in series. That is, in this example, the control IC 22a starts to use the battery packs and balanced at the maximum voltage by connecting the battery packs in series, and when the voltages are balanced with of other packs, then, uses other battery packs by sequentially adding the battery packs to the series connection.

Figure 12C:
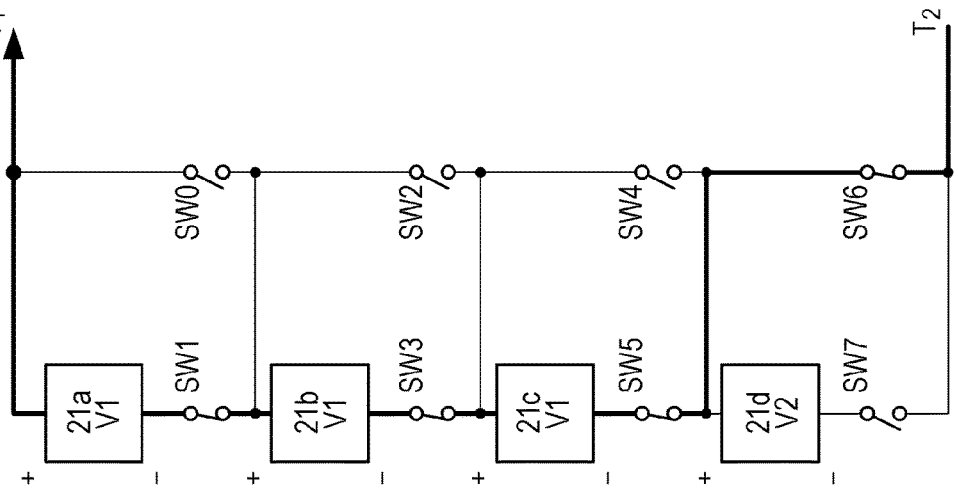
FIG. 12A to FIG. 12C are diagrams illustrating examples of selecting battery packs.
Figure 12B:
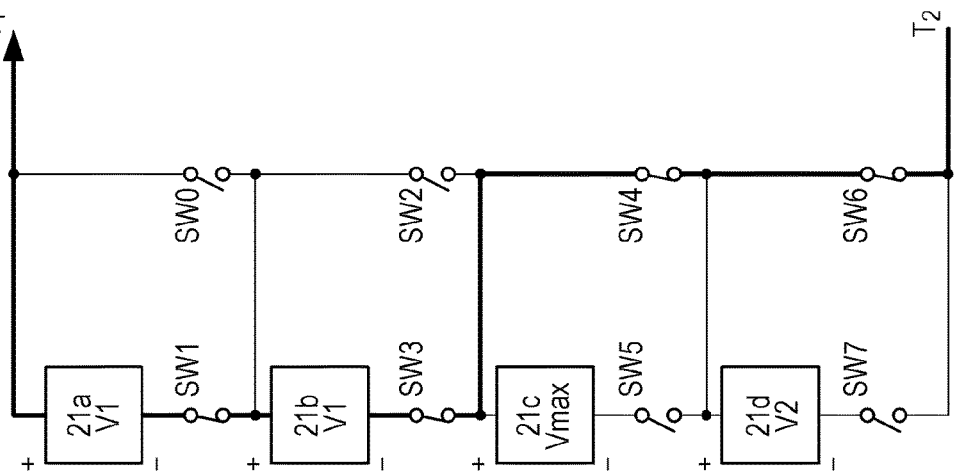
Figure 12A:
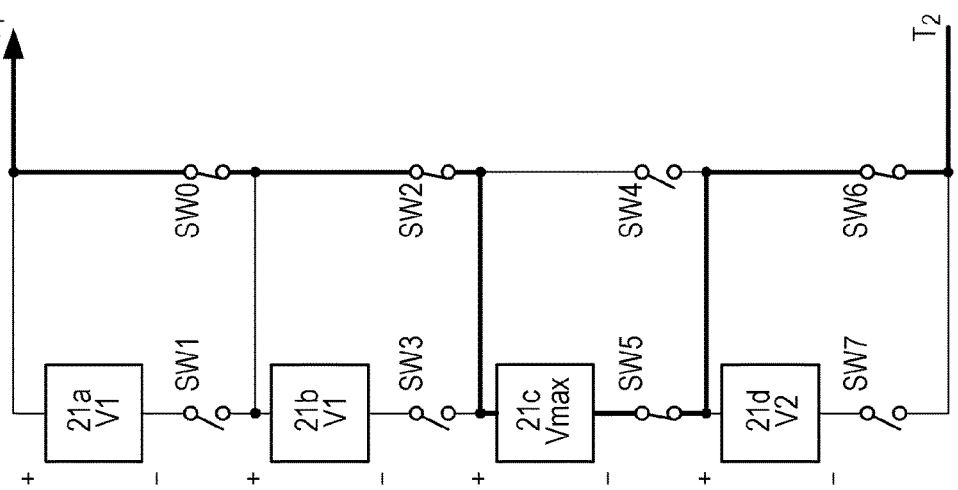

FIG. 12A illustrates an example in which the voltages of the battery packs 21a and 21b are V1, the voltage of the battery pack 21c is the maximum value Vmax and the voltage of the battery pack 21d is V2. Here, Vmax>V1>V2. When a situation in this example occurs in the electric power saving mode, in the processing illustrated in FIG. 8, the control IC 22a determines through the processing items in STEPs S200 and 205 that the battery packs 21a and 21b are balanced, and determines that the printing device is not in the print mode in STEP S215.

As a result thereof, in STEP S225, the control IC 22a selects the battery packs 21c having the highest voltage as the battery packs to be used, and performs STEP S235 through STEP S230. That is, as illustrated in FIG. 12A, the control IC 22a sets the switches SW0, SW2, SW5, and SW6 to be in ON states, and sets the switches SW1, SW3, SW4, and SW7 to be in OFF states. As a result, the power source 20 supplies the electric power from the battery packs to be used 21c.

On the other hand, when the situation in which the voltages of the battery packs 21a and 21b are V1, the voltage of the battery pack 21c is the maximum value Vmax and the voltage of the battery pack 21d is V2 occurs in the print mode, in the processing illustrated in FIG. 8, the control IC 22a determines through STEPs S200 and 205 that the battery packs 21a and 21b are balanced, and determines that the printing device is in the print mode in STEP S215.

As a result, in STEP S220, the control IC 22a selects the combination of the battery packs (battery packs 21a and 21b) having the highest voltage as the battery packs to be used, and performs STEP S235. That is, as illustrated in FIG. 12B, the control IC 22a sets the switches SW1, SW3, SW4, and SW6 to be in ON states, and sets the switches SW0, SW2, SW5, and SW7 to be in OFF states. As a result, the power source 20 supplies the electric power by connecting the battery packs 21a and 21b to be used in series.

Furthermore, the situation illustrated in FIG. 12B continues and when the voltages of the battery packs 21c reaches V1, in the processing illustrated in FIG. 8, the control IC 22a determines through STEPs S200 and 205 that the battery packs 21a to 21c are balanced and performs STEP S220 through STEP S215. Since the battery packs 21a to 21c are selected in STEPs described above as the battery packs to be used, the control IC 22a sets the switches SW1, SW3, SW5, and SW6 to be in ON states, and sets the switches SW0, SW2, SW4, and SW7 to be in OFF states as illustrated in FIG. 12C in STEP S235. As a result, the power source 20 supplies the electric power by connecting the battery packs 21a to 21c to be used in series. That is, in this example, when the number of balanced battery packs increases, the control IC 22a uses the increased battery packs by sequentially adding the battery packs to the series connection.

Figure 13B:
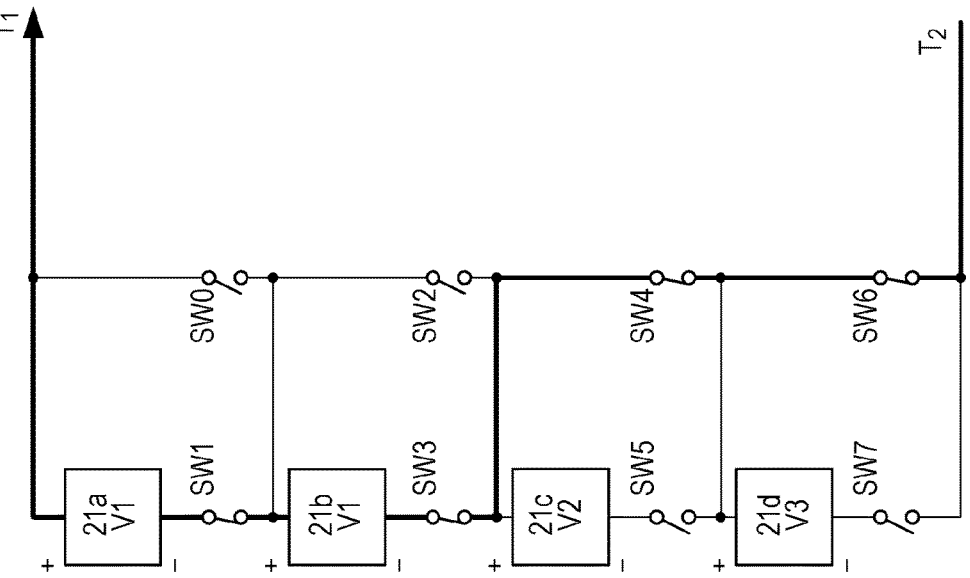
FIG. 13A to FIG. 13B are diagrams illustrating examples of selecting battery packs.
Figure 13A:
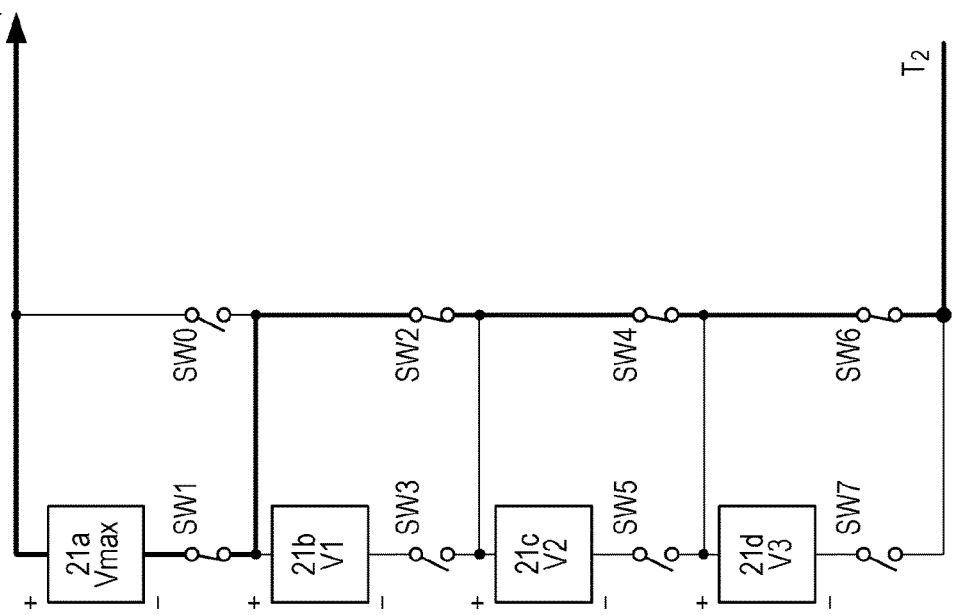

FIG. 13A illustrates an example in which the voltages of the battery packs 21a and 21d are Vmax, V1, V2, and V3 respectively and all of the voltages are different from each other. Here, Vmax>V1>V2>V3. When a situation in this example occurs in the electric power saving mode, in the processing illustrated in FIG. 8, the control IC 22a selects the battery packs 21a having the highest voltage as the battery pack to be used in STEP S210 without determining through the processing items in STEPs S200 and 205 that the battery packs are balanced. Then, in STEP S240, as illustrated in FIG. 13A, the control IC 22a sets the switches SW1, SW2, SW4, and SW6 to be in ON states, and sets the switches SW0, SW3, SW5, and SW7 to be in OFF states. As a result, the power source 20 supplies the electric power from the battery packs to be used 21a.

Furthermore, the situation illustrated in FIG. 13A continues and when the voltage of the battery packs 21b reaches V1, in the processing illustrated in FIG. 8, the control IC 22a determines through STEPs S200 and 205 that the battery packs 21a and 21b are balanced and performs STEP S220 or STEP S225 through STEP S215. Since the battery packs 21a and 21b are selected in STEPs described above as the battery packs to be used, the control IC 22a sets the switches SW1, SW3, SW4, and SW6 to be in ON states, and sets the switches SW0, SW2, SW5, and SW7 to be in OFF states as illustrated in FIG. 13B in STEP S235. As a result, the power source 20 supplies the electric power by connecting the battery packs 21a and 21b to be used in series. That is, in this example, when the number of balanced battery packs increases, the control IC 22a uses the increased battery packs by sequentially adding the battery packs to the series connection.

Figure 14B:
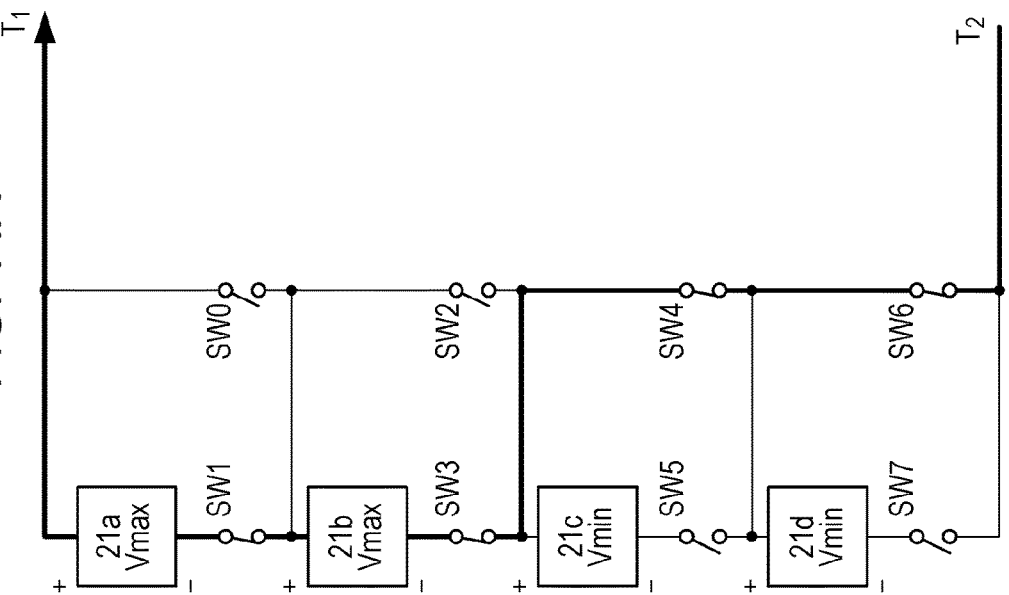
FIG. 14A to FIG. 14B are diagrams illustrating examples of selecting battery packs.
Figure 14A:
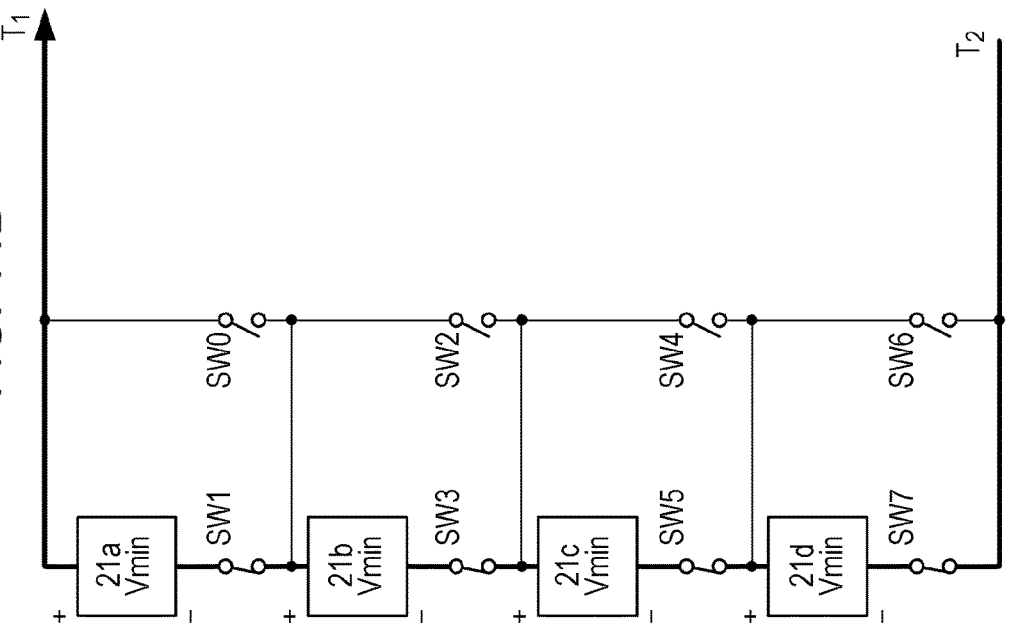

FIG. 14A illustrates an example in which the voltages of the battery packs 21a and 21b are the maximum value Vmax, the voltage of the battery pack 21c and 21d are the minimum value Vmin. When a situation in this example occurs, in the processing illustrated in FIG. 8, the control IC 22a determines through the processing items in STEPs S200 and 205 that the battery packs 21a and 21b are balanced and that the battery packs 21c and 21d are balanced, and performs STEP S220 or STEP 225 through STEP S215. Since the battery packs 21a to 21b are selected in STEPs described above as the battery packs to be used, the control IC 22a sets the switches SW1, SW3, SW4, and SW6 to be in ON states in STEP S235, and sets the switches SW0, SW2, SW5, and SW7 to be in OFF states as illustrated in FIG. 14A. As a result, the power source 20 supplies the electric power by connecting the battery packs 21a and 21b to be used in series.

Furthermore, the situation illustrated in FIG. 14A continues and when the voltages of the battery packs 21a and 21b reach V1, in the processing illustrated in FIG. 8, the control IC 22a determines through STEPs S200 and 205 that the battery packs 21a to 21d are balanced and performs STEP S220 or STEP S225 through STEP S215. Since the battery packs 21a to 21d are selected in STEPs described above as the battery packs to be used, the control IC 22a sets the switches SW1, SW3, SW5, and SW7 to be in ON states, and sets the switches SW0, SW2, SW4, and SW6 to be in OFF states as illustrated in FIG. 14B in STEP S235. As a result, the power source 20 supplies the electric power by connecting the battery packs 21a to 21d to be used in series. That is, in this example, when the number of balanced battery packs increases, the control IC 22a uses the increased battery packs by sequentially adding the battery packs to the series connection.

6. Other Embodiments

The embodiments described above are examples for embodying the present invention, and other various embodiments such as combinations of the above-described two embodiments can be adopted.

For example, in the first embodiment, the battery used in the second state is not limited to a single battery. In the embodiments described above, in the electric power saving mode, the voltage required to drive the main circuit 70 is 3.3 V and the output voltage from one cell is nearest to the voltage 3.3 V. Therefore, it is possible to prevent the electric power loss in the step up-down circuit 60 by supplying the electric power from one cell without connecting two or more cells in series in the electric power saving mode. Therefore, if the required voltage in the electric power saving mode is near the voltage obtained by connecting a few cells in series such as 6 V, the electric power may be output by connecting a plurality of cells such as two cells in series.

In addition, in the first embodiment, the connection mode in the second state is not limited to the connection in series. For example, in a case where the voltage near the voltage of one cell is required in the electric power saving mode, a plurality of cells may be connected in parallel. FIG. 5B illustrates an example of a case where the cells 21a to 21c are connected in parallel. For example, in STEPs S200 to S210 described above, the above-described example is realized by the control IC 22 selecting three cells of which the cumulative using times are short, setting the switches SW1 to SW6 to be in ON state and setting other switches to be in OFF sate upon starting the measurement of the cumulative using time. According to this configuration, it is possible to extend a drivable time in the electric power saving mode compared to that in the state illustrated in FIG. 4A. In addition, it is possible to prevent the deterioration in at least one cell by not using at least one cell of the cells 21a to 21d.

In the first embodiment, the plurality of batteries include a plurality of electrodes generating the electric potential difference, and thus, the configuration may be sufficient as long as the electric power can be supplied to the circuit wired by wiring to the electrodes. Therefore, each battery may be configured with a single cell or may be configured with a plurality of cells connected in series or in parallel. In addition, the battery may be a primary battery or a secondary battery. Furthermore, the types of the battery such as modes of the energy source or modes of the electrodes are not particularly limited, and various types of the battery may be adopted.

In the first embodiment, the switching circuit may be realized by a circuit or the like including a control unit that changes the wiring state using the switches as long as the switches can switch the state to and from the first state and the second state. That is, a circuit that can switch the state in which a plurality of batteries are connected in series or the state in which a part of batteries are not used may be configured, and then, the first state and the second state may be switched by switching the ON and OFF states using the control unit.

In the first embodiment, the first state may be any state as long as a plurality of batteries are connected in series and the electric power is supplied to the outside. That is, a plurality of batteries may be connected in series such that the voltage obtainable from those batteries can be maximized in the first state. The plurality of batteries used in the first state are the entire of the plurality of batteries included in the power source. However, a case can be considered where the batteries are connected in parallel in combination with the connection in series, not limited to the state in which all the batteries are connected in series. For example, a configuration can be exemplified, in which halves the plurality of batteries are connected in series and two sets of battery groups connected in series are connected in parallel. Even in this configuration, since half the plurality of batteries are connected in series, the maximum value obtainable by using the half the batteries can be output.

In the first embodiment, generally, a voltage (or a voltage range) to be applied to the external load that receives the electric power supplied from the power source is determined depending on the specification. In many cases, a voltage applied to the load and a voltage that can be output from a combination of a plurality of batteries are different from each other (in a case where the commercial power source can be supplied to the load, that voltage is also different).

In this case, the voltage of the electric power supplied from the power source is applied to the load after the conversion by the step up-down circuit. In this case, generally, the electric power conversion efficiency increases (the loss decreases) as the voltage difference between before and after the conversion decreases. In a case of configuring a system (an electronic device or the like) that includes a power source and an external load, generally, the system is configured in such a manner that a maximum value of the voltage that can be output from a plurality of batteries is not equal to or greater than a maximum value of the voltage to be applied to the load.

Therefore, according to such a configuration, if entire of the plurality of batteries are connected in series in the first state, the electric power can be supplied to the step up-down circuit at the maximum voltage obtainable from the plurality of batteries, and thus, it is possible to perform the conversion at the highest electric power conversion efficiency obtainable from the plurality of batteries, and to supply the electric power to the load.

In the first embodiment, the second state may be any state as long as the electric power is supplied to the outside using the remaining batteries without using a part of the plurality of batteries. That is, in the second state, the configuration may be sufficient as long as the deterioration of the batteries can be prevented in a part of the batteries included in the power source. The number of the batteries used in the second state may be one or may be plural. In addition, in a case where a plurality of batteries are used in the second state, the connection modes of the batteries may be a connection in series or may be a connection in parallel.

The destination of the electric power in each state in the first embodiment may be the outside of the switching circuit or any arbitrary load can be assumed. However, the configuration in which the electric power is preferably supplied to the load by switching the states to and from the first state and the second state, that is, the configuration in which the load can vary, is preferable.

Furthermore, since a part of a plurality of batteries are not used in the second state in the first embodiment, the batteries selected from a plurality of choices in the second state. For selecting the batteries, various selection criteria can be adopted. In this configuration example, a configuration can be adopted, in which the switching circuit makes the batteries of which the cumulative using time are short be used in the second state. That is, if the batteries of which the cumulative using time which is obtainable by accumulating the using time from starting of using each of the batteries is short are used, it is possible to make the cumulative using time uniform in each of the plurality of batteries.

When the cumulative using time of the batteries becomes long, the amount of remaining electric power of the batteries decreases and the degree of deterioration of the batteries increases (particularly in case of the secondary batteries), by making the cumulative using time uniform in each of the plurality of batteries, the amount of remaining electric power can be made uniform in each of the plurality of batteries, and thus, the degrees of deterioration of the batteries can be made uniform. In addition, the batteries having a relatively high voltage may be selected to be used. The selection may be performed using both the voltage and the cumulative using time. Specifically, in a case where there are a plurality of batteries of which the cumulative using time is longest, the batteries having the highest voltage may be selected from those batteries, and in a case where there are a plurality of batteries having the highest voltage, the batteries of which the cumulative using time is longest may be selected from those batteries. Here, in referring "the cumulative using time is longest or the voltage is highest", margins may be allowed and other batteries of which the cumulative using time is shorter than that of the batteries of which the cumulative using time is strictly longest as much as the margin may be regarded as the batteries of which the cumulative using time is longest, or other batteries having the voltage lower than that of the batteries strictly having the highest voltage as much as the margin may be regarded as the batteries having the highest voltage.

Furthermore, a configuration may be adopted, in which the batteries in using are switched during the period when the switching circuit in the first embodiment supplies the electric power to the outside in the second state. That is, the switching circuit dynamically switches the batteries used during the period of the second state. According to this configuration, even when the second state continues for a long time, no big difference occurs between the cumulative using times of each of the batteries. This configuration can be realized, for example, by changing the processing in a case where it is determined in STEP S215 in the embodiment described above that the print mode signal is not present. Specifically, in this configuration, in a case where it is determined in STEP S215 that the print mode signal is not present, the control IC 22 determines whether or not the cell of which the cumulative using time is shortest is present other than the cells to be used. In a case where the cell of which the cumulative using time is shortest is present other than the cells to be used and furthermore, in a case where a time difference occurs between the cumulative using times of the former and the latter, the control IC 22 switches the cell to be used to the latter and returns the process to STEP S205.

Furthermore, the switching circuit in the first embodiment may be configured in such a manner that, every time when the state is switched from the first state to the second state, the switching circuit uses a battery different from the battery used in immediately preceding second state. That is, the cumulative using times of each of the plurality of batteries can be uniform by changing the batteries in use every time when the state is switched to the second state from the first state. According to this configuration, it is possible to make the cumulative using times of each of the plurality of batteries be uniform using a simple control. This configuration can be realized by, for example, causing the control IC 22 to store the finally used cells in the memory, and to set the cells that are different from the finally used cells as the cells to be used in STEP S200 described above. Of course, at this time, the control IC 22 may select the cells to be used according to an order of using the cells, or may set the cells of which the cumulative using time is shortest as the cells to be used from the cells other than the cells finally used.

Furthermore, in the first embodiment, the switching circuit may be configured in such a manner that, in a case where the state is switched to the first state from the second state, the switching circuit switches the state to the first state after the plurality of batteries are in short circuits. That is, since the voltages of each of the plurality of batteries connected in series are required to be uniform, if the plurality of batteries are in short circuits before the plurality of batteries being connected in series in the first state, it is possible to supply the electric power to the outside in the first state in which the plurality of batteries having the uniform voltages are connected in series. When making the plurality of batteries be in short circuits, the plurality of batteries may be in short circuits in the state of being connected in series or may be in short circuits in the state of being connected in parallel.

Furthermore, in the first embodiment, in a case where the state is switched to the first state from the second state, the switching circuit may switch the state to the first state after the entire of the plurality of batteries are in short circuits and it is determined that the voltage difference in the plurality of batteries becomes smaller than the threshold value. According to this configuration, it is possible to connect the plurality of batteries in series in the state in which the voltages of the plurality of batteries are regarded to be uniform.

In the second embodiment, the plurality of batteries include a plurality of electrodes generating the electric potential difference, and thus, the configuration may be sufficient as long as the electric power can be supplied to the circuit wired by wiring to the electrodes. Therefore, each battery may be configured with a single cell or may be configured with a plurality of cells connected in series or in parallel. In addition, the battery may be a primary battery or a secondary battery. Furthermore, the types of the battery such as modes of the energy source or modes of the electrodes are not particularly limited, and various types of the battery may be adopted.

In the second embodiment, the selection circuit may be configured such that the batteries having relatively high voltage can be selected from a plurality of batteries, and the selection circuit can be realized by a circuit or the like that can select an arbitrary battery according to the control by a control unit that changes the wiring state using the switches or the like. That is, the selection circuit may select the batteries to be used based on voltages of the batteries, and may connect the selected batteries in the arbitrary connection mode (the connection in series or the connection in parallel) by switching the switches to and from ON and OFF state, and can supply the electric power to the outside.

In the second embodiment, in a case of comparing the selected batteries with the plurality of batteries, the voltage of the selected battery may be higher than that of at least another one battery among the plurality of batteries, or the voltage of the selected battery may be highest. Of course, the selected battery may be one or may be plural. In a case where a plurality of batteries are selected, the selected batteries may be connected in series or may be connected in parallel. The connection in series is a configuration preferable to a case where the high voltage is required and the connection in parallel is a configuration preferable to a case where the electric power is required to be supplied for a long time.

Furthermore, in the second embodiment, as a configuration example of selecting the batteries having relatively high voltage, the selection circuit may select a plurality of batteries in which the voltage difference is equal to or smaller than the threshold value, and the electric power may be supplied to the outside by connecting the plurality of selected batteries in series. That is, in the plurality of batteries in which the voltage difference is equal to or smaller than the threshold value, the voltages are balanced and even when these batteries are connected in series, the movement of the electric charges between the batteries does not occur (or extremely small), and thus, it is possible to prevent the loss of the electric power due to the movement of the electric charges. The threshold value may be set such that the loss due to the movement of the electric charges can be ignored (regarding the threshold value, similar in the description below). That is, in the plurality of batteries having the voltage difference equal to or smaller than the threshold value, the threshold value may be set such that the voltages can be regarded as uniform.

Generally, a voltage (or a voltage range) to be applied to the external load that receives the electric power supplied from the power source is determined depending on the specification. At least one of the plurality of voltages that can be output in a combination of the plurality of voltages and the voltage applied to the load are different from each other. Therefore, in a case where the voltage different from the voltage applied to the load is output from the power source, the voltage is supplied to the load after the voltage is converted by the step up-down circuit. In this conversion, generally, the electric power conversion efficiency increases (the loss decreases) as the voltage difference between before and after the conversion decreases.

In the second embodiment, in a case of configuring a system (an electronic device or the like) that includes a power source and an external load, generally, the system is configured in such a manner that a maximum value of the voltage that can be output from a plurality of batteries is not equal to or greater than a maximum value of the voltage to be applied to the load. Therefore, according to such a configuration, if the configuration in which a plurality of batteries having relatively high voltage are connected in series is adopted, the electric power can be supplied to the step up-down circuit at the maximum voltage obtainable from the plurality of batteries, and thus, it is possible to perform the conversion at the highest electric power conversion efficiency obtainable from the plurality of batteries, and to supply the electric power to the load.

Furthermore, the selection circuit in the second embodiment may be configured to select the batteries based on the load of external load. This configuration can be realized as follows, for example. In a case where the outside requires a low voltage (the external load is low), the selection circuit selects the batteries having the highest voltage and supplies the electric power to the outside using the selected batteries, and in a case where the outside requires a high voltage (the external load is high), the selection circuit selects a combination of the batteries in which the voltage difference is equal to or smaller than the threshold value and having the highest voltage, and supplies the electric power to the outside by connecting the plurality of selected batteries in series.

That is, in the second embodiment, in a case where the outside requires a low voltage, since the batteries having the highest voltage is selected, it is possible to supply the electric power to the outside using the batteries having largest amount of remaining electric power and having the longest usable term in a case where the outside requires a low voltage. Of course, in this case, in a case where a plurality of batteries having the highest voltage are present (a plurality of batteries in which the voltage difference is equal to or smaller than the threshold value and can be regarded to be balanced are present), those batteries may be connected in series or may be connected in parallel, and a single battery among the plurality of batteries may be used alone.

On the other hand, in a case where the outside requires a high voltage, the selection circuit combines a plurality of batteries in which the voltage difference is equal to or smaller than the threshold value, that is, a plurality of batteries that are balanced, and connects plurality of batteries in series. Therefore, it is possible to supply the electric power to the outside using the batteries in which the electric power loss does not occur due to the movement of the electric charges. In addition, the selection circuit selects the combination of the batteries having the highest voltage among the combinations of the balanced batteries. As a result, the combination of the batteries having the highest voltage is selected from the combinations of the balanced batteries, and thus, the electric power can be supplied to the outside at the maximum voltage that can be output from the combination of the balanced batteries using the connection in series. Therefore, even in a case where the electric power is converted by the step up-down circuit, the conversion can be performed at the high electric power conversion efficiency, and thus, it is possible to supply the electric power to the load.

Furthermore, in the second embodiment, in a case where the voltage difference between the battery and another battery becomes equal to or smaller than the threshold value due to the supply of the electric power from the batteries, the selection circuit may be configured such that the electric power is supplied to the outside by connecting the battery and another battery in series. That is, in a case where the amount of electric power in the battery in use decreases and the voltage of the battery is balanced with the voltage of another battery due to the decrease of the voltage, the electric power is output to the outside by the combination of the battery and another battery connected in series. According to this configuration, in the operation process of the power source, it is possible to shift the state to the state in which the conversion can be performed at the high electric power conversion efficiency and can supply the electric power to the load while preventing the electric power loss.

Furthermore, in the second embodiment, an electronic device may be configured so as to include the power source described above, and operates using the electric power supplied from the power source. As the electronic device, various devices that are driven by the power source can be considered such as a printing device, a scanner device, an imaging device, a calculation device, a mobile terminal or the like, and a multi-function device that includes the device described. Furthermore, as described above, a method in the present invention in which the batteries having the relatively high voltage is selected and used from a plurality of batteries can also be realized as a method.

Furthermore, an electronic device may be configured so as to include the power source described above, and operates using the electric power supplied from the power source. As the electronic device, various devices that are driven in the first state and the second state the power source can be considered such as a printing device, a scanner device, an imaging device, a calculation device, a mobile terminal or the like, and a multi-function device that includes the device described. Furthermore, as described above, a method in the present invention in which a plurality of batteries are connected in series in the first state and a part of the batteries are not used in the second state, can also be realized as a method.

What is claimed is:

1. A power source comprising:
a plurality of batteries; and
a selection circuit that selects a battery from the plurality of batteries having a high voltage relative to a voltage of at least one other battery of the plurality of batteries, and supplies an electric power to an outside using the selected battery,
wherein the selection circuit selects, in addition to the selected battery, at least one other battery of the plurality of batteries in which a voltage difference of the selected battery and the at least one other battery is smaller than a threshold value, and supplies the electric power to the outside by connecting the selected battery and the at least one other battery in series.

2. An electronic device comprising the power source according to claim 1 and which is operated by an electric power supplied from the power source.

3. A power source comprising:
a plurality of batteries; and
a selection circuit that selects a battery from the plurality of batteries having a high voltage relative to a voltage of at least one other battery of the plurality of batteries, and supplies an electric power to an outside using the selected battery,
wherein, in a case where the outside requires a low voltage, the selection circuit selects the battery having the highest voltage as the selected battery and supplies the electric power to the outside using the selected battery, and
in a case where the outside requires a high voltage, the selection circuit selects the battery having the highest voltage as the selected battery and selects at least one other battery of the plurality of batteries in which a voltage difference of the selected battery and the at least one other battery is equal to or smaller than a threshold value, and supplies the electric power to the outside by connecting the selected battery and the at least one other battery in series.

4. A power source comprising:
a plurality of batteries;
a selection circuit that selects a battery from the plurality of batteries having high voltage relative to a voltage of at least one other battery of the plurality of batteries, and supplies an electric power to an outside using the selected battery; and a switching circuit that switches a state to and from a first state in which the electric power is supplied to the outside by the plurality of batteries including the selected battery being connected in series and a second state in which the electric power is supplied to the outside using a first part of the plurality of batteries including the selected battery without using a second part of the plurality of batteries.

5. The power source according to claim 4, wherein, in a case where a voltage difference between the selected battery and another battery of the plurality of batteries becomes equal to or smaller than a threshold value due to the supplying of the electric power from the selected battery, the selection circuit supplies the electric power to the outside by connecting the selected battery and the other battery in series.

6. The power source according to claim 4, wherein the switching circuit uses the selected battery and of which a cumulative using time is shorter in the second state than in the first state.

7. The power source according to claim 6, wherein the switching circuit switches the batteries in use in a period when the electric power is supplied to the outside in the second state.

8. The power source according to claim 6, wherein, every time when the state is switched from the first state to the second state, the switching circuit uses a battery different from the battery used in the first state preceding the second state.

9. The power source according to claim 4, wherein, in a case where the state is switched to the first state from the second state, the switching circuit switches the state to the first state when the plurality of batteries become short circuits.

10. The power source according to claim 9, wherein, in a case where the state is switched to the first state from the second state, the switching circuit switches the state to the first state when the plurality of batteries become short circuits and it is determined that a voltage difference of the selected battery and at least one other battery in the plurality of batteries becomes smaller than a threshold value.

* * * * *